United States Patent [19]

Peyton et al.

[11] Patent Number: 4,501,365
[45] Date of Patent: Feb. 26, 1985

[54] TRANSFER SYSTEM

[75] Inventors: John J. Peyton; Bryan K. Watt, both of Santa Barbara, Calif.

[73] Assignee: Industrial Automation Corp., Goleta, Calif.

[21] Appl. No.: 314,780

[22] Filed: Oct. 26, 1981

[51] Int. Cl.³ .......................... B07C 5/36; B65G 47/46
[52] U.S. Cl. .................................. 209/548; 198/372; 198/440; 209/564; 209/653
[58] Field of Search ............... 209/522, 523, 546, 548, 209/552, 555, 559–566, 651, 653, 925, 934; 198/356, 362, 364, 437, 440, 367, 372

[56] References Cited

U.S. PATENT DOCUMENTS

| | | | |
|---|---|---|---|
| 3,096,871 | 7/1963 | Anderson | 198/470 X |
| 3,451,547 | 6/1969 | Greller | 209/653 |
| 3,471,012 | 10/1969 | Calhoun | 209/653 X |
| 3,757,940 | 9/1973 | Damm | 209/565 X |
| 3,791,518 | 2/1974 | Vanderhoof | 209/552 |
| 3,923,158 | 12/1975 | FornÅÅ | 209/555 X |
| 4,369,873 | 1/1983 | Heuft | 198/367 |

FOREIGN PATENT DOCUMENTS 2098565 11/1982 United Kingdom ............... 209/653

Primary Examiner—Robert B. Reeves
Assistant Examiner—Edward M. Wacyra
Attorney, Agent, or Firm—Blakely, Sokoloff, Taylor & Zafman

[57] ABSTRACT

An improved rejector for selectively transferring articles from a conveyor or conveyor-like device, to a delivery region such as a second conveyor based upon one or more signals which may be associated with any of the articles to be so transferred. The system utilizes a further conveyor-like device running substantially parallel to the conveyor carrying the articles to be transferred, the conveyor-like device having a plurality of pusher members substantially transverse to the direction of motion of the conveyor-like device, and slideable by a guide between a normally withdrawn position and an extended position passing over the conveyor carrying the articles to be transferred so as to transfer an article therefrom to the delivery device. The system includes apparatus for determining the relative position along the conveyors of an article to be transferred and the closest pusher members so that one pusher member may be extended to centrally engage the article to be rejected, or two members may be extended to engage each side of the article being rejected. High speed operation is accommodated by using a plurality of actuators to initiate the motion of the pusher members so that the system may be operated at a speed greater than the capability of any single actuator used for that purpose. The system further includes apparatus for advancing and retarding the initiation of actuation of the actuators controlling the pusher members so as to compensate for the fixed actuation time requirement of the actuators for different systems and particularly high speed system operation. Various other aspects of the invention are disclosed.

38 Claims, 14 Drawing Figures

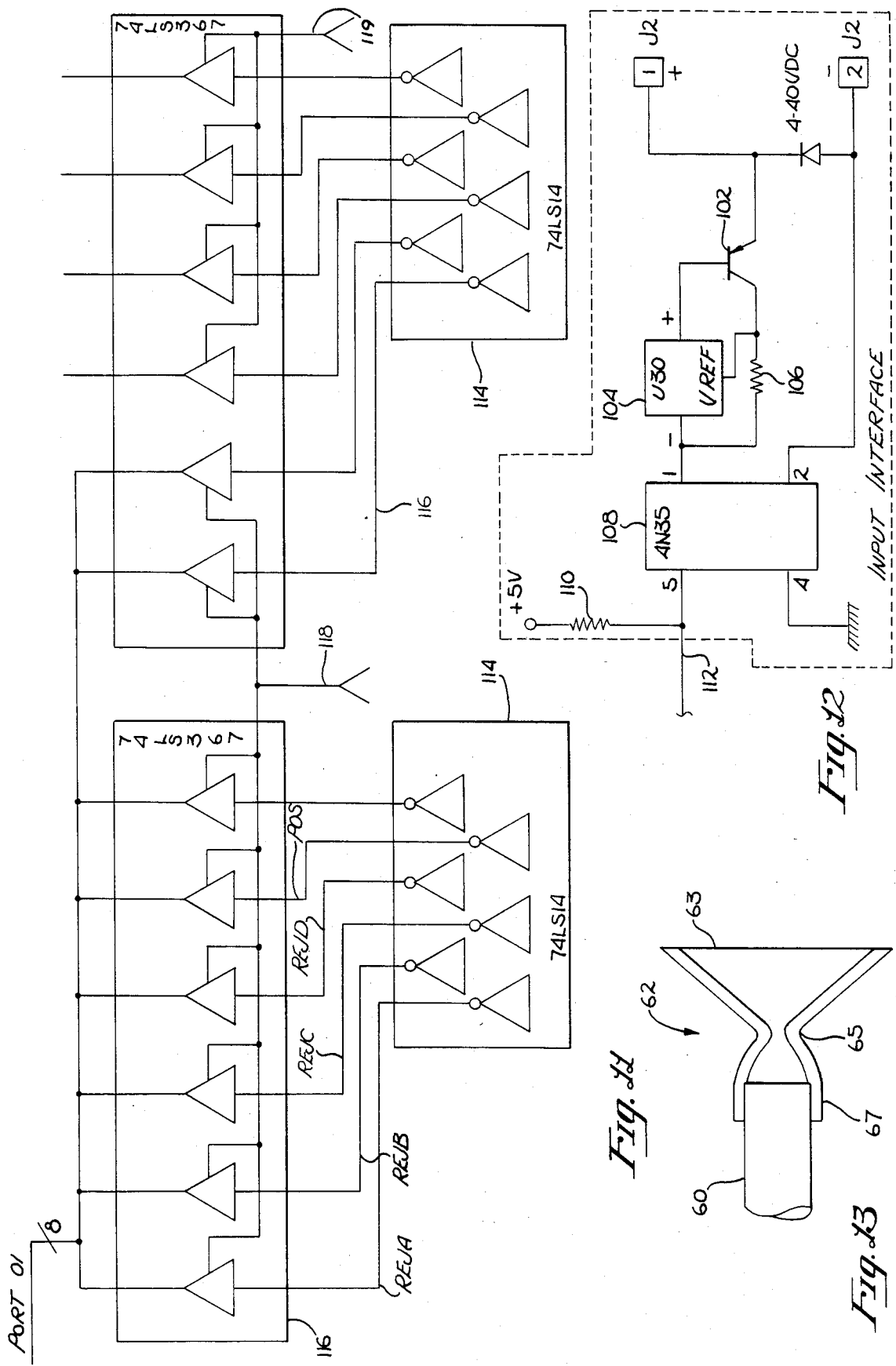

TRANSFER SYSTEM

BACKGROUND OF THE INVENTION

1. Field of the Invention

The present invention relates to the field of handling equipment and more specifically, to the field of equipment for transferring articles from one line such as a conveyor line to a delivery region such as a second conveyor line.

2. Prior Art

In various aspects of the processing and packaging industries such as food and beverage processing and packaging, it becomes desirable to automatically selectively transfer articles from one conveyor to a second conveyor based upon some quantitive or qualitive characteristic of the article being transferred in comparison to the articles not being so transferred. By way of specific example, U.S. Pat. No. 3,009,572 discloses various embodiments of apparatus for sorting articles, the apparatus specifically disclosed therein being adapted for segregating or sorting articles according to weight classifications, and rejecting from a stream of articles those articles which are over or under the limits of a predetermined weight range. That system uses a special relatively wide conveyor-like apparatus which has a plurality of transfer slides thereon onto which the weighed articles pass from another conveyor. The slides normally are centered in the apparatus and guided by appropriate guides therefor so as to remain centered, ultimately being delivered at the center of the end of the conveyor-like apparatus. If however, an article is overweight, the system is controlled so that the slides carrying the article are initially deflected in a first direction from center at a particular position along the path of travel, at which position the slides pick up fixed guides which further guide and move the slides to the first side of the conveyor-like apparatus for delivery at the first side of the end of the conveyor-like structure. If, on the other hand, a particular article is underweight, the slides will be deflected at the control point toward the second side of the conveyor-like apparatus where additional fixed slides will guide the slides toward the second side of the conveyor-like apparatus for delivery of the article adjacent the second side of the conveyor-like apparatus at the end thereof, whereby proper weight, overweight and underweight articles will be delivered at three distinct positions at the end of the apparatus. All slides are returned to the central position by appropriate fixed guides prior to their receipt of further articles to be sorted.

U.S. Pat. No. 2,936,059 discloses an all automatic apparatus for handling curved surface articles. That apparatus includes slides which operate in a similar manner, though rather than the slides having the articles to be sorted resting thereon, the slides of the '059 patent project in a direction perpendicular to the path of travel of a conveyor containing the articles to be transferred and when extended, engage the articles from the side to slide them off that conveyor into other apparatus. The system of U.S. Pat. No. 3,471,012 is very similar to the two mentioned patents, having the side transfer characteristics of the '059 patent and the selective transfer of single articles of the '572 patent.

The advantage of the general type of transfer device or rejector of the foregoing three patents is that the transfer of articles from a given path to a second path is accomplished over some extended length of travel (and according, over some significant period of time) as opposed to being done very quickly, such as in the systems disclosed in U.S. Pat. Nos. 3,270,881 and 3,133,640, wherein articles which are proceeding on a conveyor but are to be rejected are merely pushed sideways by the momentary actuation of an actuator at a particular point along the article's path of travel. The characteristically longer time of the transfer of systems such as are disclosed in the '012, the '059 and the '572 patents results in a gentler handling of the articles being transferred, an advantage when handling fragile articles such as glass bottles. Alternatively, such equipment is generally capable of higher speed operation than equipment affecting the transfer on a more violent basis because the smoothness of the transfer is more compatible with higher speed. However, neither the system of the '012 patent nor of the '572 patent is suitable for particularly high speeds, as the selective actuation of the pusher members is by way of actuators which require a substantial length of time for actuation in comparison to the frequency with which the pusher members would pass thereby in high speed machines.

BRIEF SUMMARY OF THE INVENTION

An improved rejector for selectively transferring articles from a conveyor or conveyor-like device, to a delivery region such as a second conveyor based upon one or more signals which may be associated with any of the articles to be so transferred. The system utilizes a further conveyor-like device running substantially parallel to the conveyor carrying the articles to be transferred, the conveyor-like device having a plurality of pusher members substantially transverse to the direction of motion of the conveyor-like device, and slideable by a guide means between a normally withdrawn position and an extended position passing over the conveyor carrying the articles to be transferred so as to transfer an article therefrom to the delivery device. Each pusher member will normally remain in the withdrawn position unless motion is specifically initiated toward the extended position, after which the pusher member will pick up fixed cam surfaces to proceed through the extension and subsequent retraction cycle. The system includes apparatus for determining the relative position along the conveyors of an article to be transferred and the closest pusher members so that one pusher member may be extended to centrally engage the article to be rejected, or two members may be extended to engage each side of the article being rejected. High speed operation is accommodated by using a plurality of actuators to initiate the motion of the pusher members so that the system may be operated at a speed greater than the capability of any single actuator used for that purpose. The system further includes apparatus for advancing and retarding the initiation of actuation of the actuators controlling the pusher members so as to compensate for the fixed actuation time requirement of the actuators for different systems and particularly high speed system operation. Various other aspects of the invention are disclosed.

BRIEF DESCRIPTION OF THE DRAWINGS

FIG. 11 is a circuit diagram illustrating part of the input circuitry for the single board computer.

FIG. 12 is a circuit diagram illustrating a typical input interface circuit.

FIG. 13 is an illustration of the preferred form of the rubber tip or cap 62 for the pusher members.

DETAILED DESCRIPTION OF THE INVENTION

Figure 1:
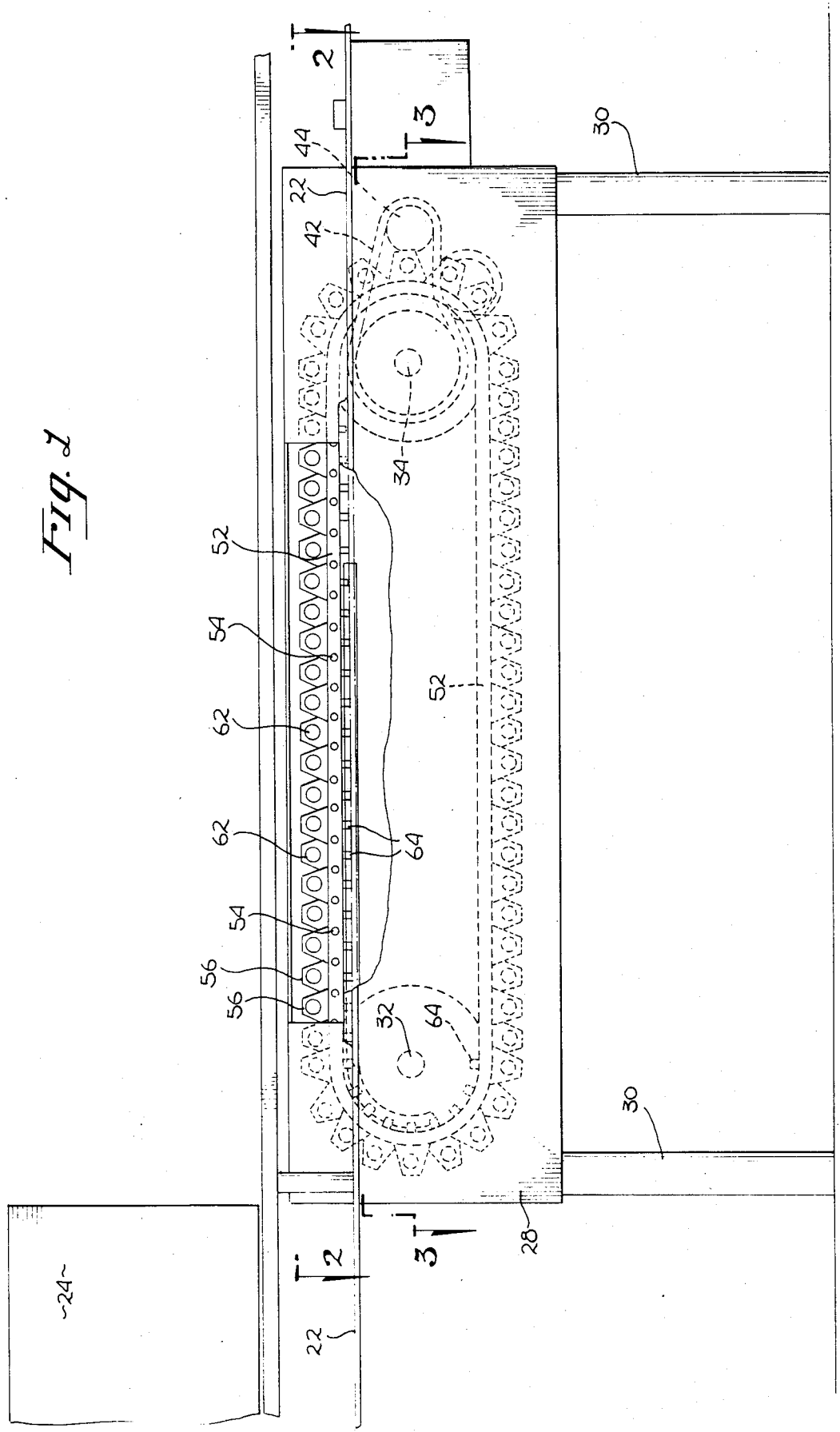
FIG. 1 is a side view of the mechanical structure of the present invention.
Figure 2:
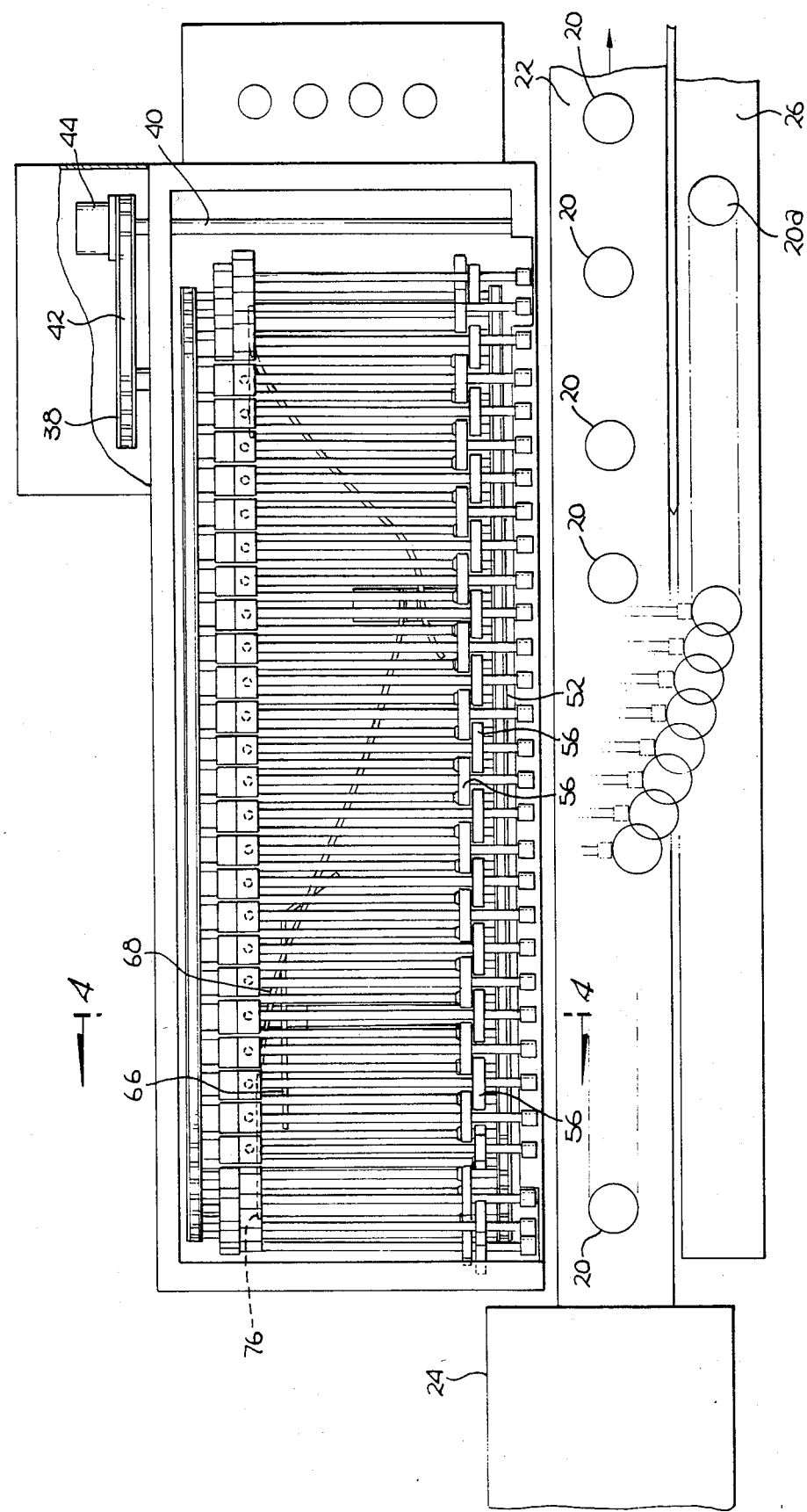
FIG. 2 is a view taken along line 2—2 of FIG. 1.
Figure 3:
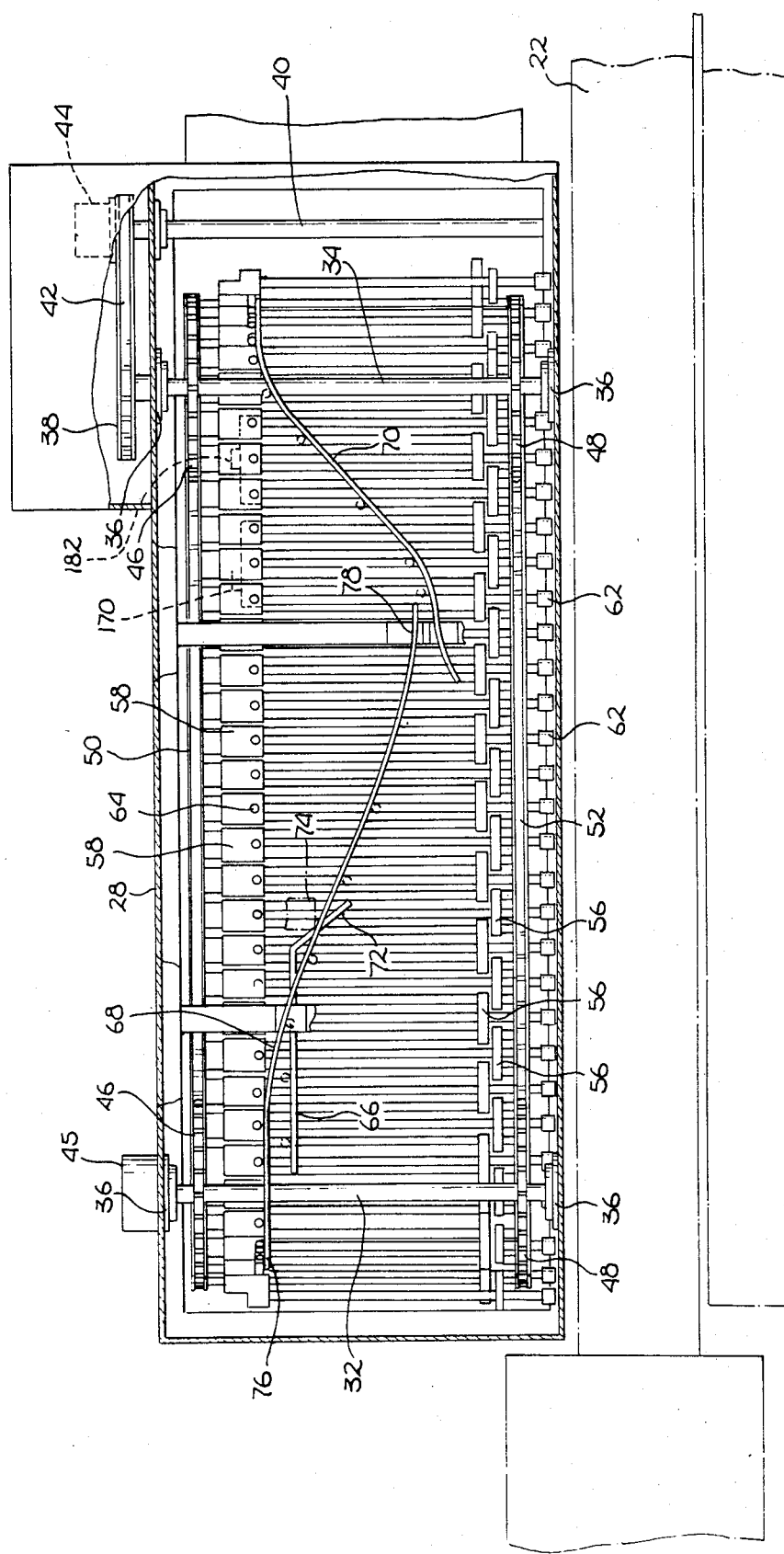
FIG. 3 is a view taken along line 3—3 of FIG. 1.

First referring to FIGS. 1 through 3, the basic mechanical assemblies of the present invention may be seen. FIG. 1 is a side view of the primary assembly, whereas FIGS. 2 and 3 are views taken along lines 2—2 and 3—3, respectively, of FIG. 1. In FIG. 2 a plurality of containers, say for example bottles 20, are proceeding from a left to right direction in that figure on a conveyor 22. In a typical application, the bottles 20 will normally be received on conveyor 22 from some inspection means 24 such as by way of example, a fill level inspector which inspects each bottle to be sure that the bottle was appropriately filled in the preceeding processing stations. Consequently, to provide greater specificity for the description to follow and so that the exemplary embodiment may be better understood, it will be presumed that the bottles 20 are received from some inspection means 24, with some of the bottles being indicated as being unacceptable, and therefor desired to be transferred from conveyor 22 to conveyor 26, such as is shown for bottle 20A. In that regard, a typical inspection means such as a fill level inspector inspects each bottle at a particular inspection point in the conveyor system and determines its acceptability before the bottle proceeds significantly from the inspection point. Accordingly, for each bottle 20 to be rejected, i.e., to be transferred from conveyor 22 to conveyor 26 an electrical signal indicating that rejection will be received from the inspection means 24 when the bottle is still a predetermined distance up the conveyor line.

The present invention system is comprised of a chassis or frame 28 mounted on legs 30 so as to be free standing in a position beside conveyor 22. Shafts 32 and 34 (see FIG. 3) are supported on frame 28 by bearings 36, shaft 34 extending through one of bearings 36 and having a sprocket 38 thereon for driving from a third shaft 40 through a chain 42. Chain 42 is not driven directly by a sprocket on shaft 40 but instead is driven from shaft 40 through a clutch assembly 44. As shall subsequently be seen, this provides the ability to quickly decouple the drive for shaft 34 from shaft 40 and to stop shaft 34 and all mechanisms driven thereby through brake 45 without requiring the stopping of shaft 40. In that regard, shaft 40 is preferably driven directly from conveyor 22 to remain synchronized with the conveyor independent of conveyor speed.

Mounted on each of shafts 32 and 34 are a pair of sprockets 46 and 48. Mounted on the sprockets are a pair of hollow pin and roller type chains 50 and 52, the upper span of each of the chains being disposed slightly above the top of conveyor 22 in the embodiment shown. The chains 50 and 52 are relatively heavy chains with the pivot pins of the chains being on approximately one and one-fourth inch centers. Extending through the pins themselves are solid pins extending transversely across the assembly so as to be common with the two chains. Thus there are a plurality of pins 54 extending through each of the chains and spanning the separation therebetween, approximately every one and one-fourth inches along the length of the chain. These pins may also be seen in FIG. 4 which is a cross section taken along line 4—4 of FIG. 2.

Figure 4:
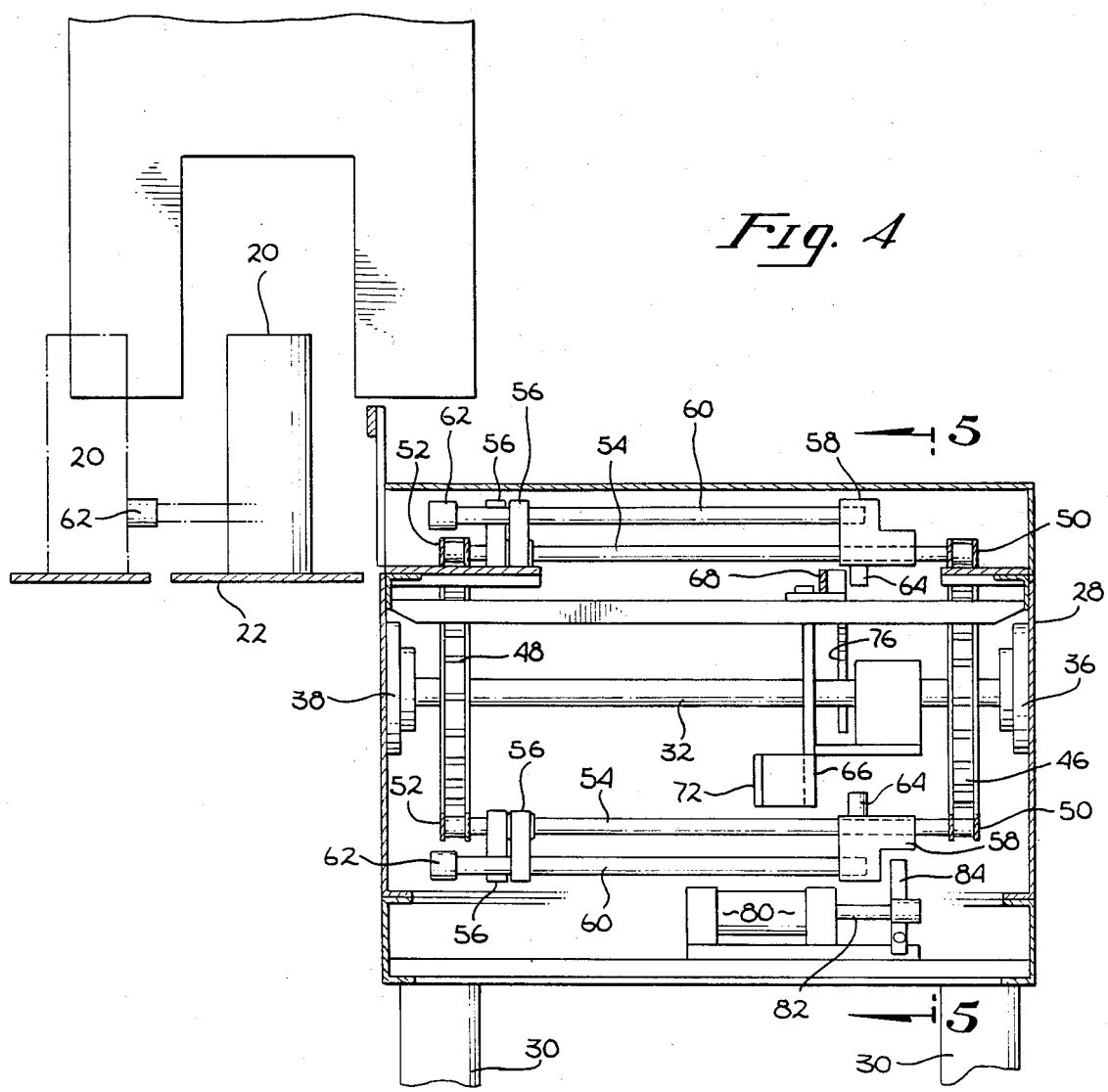
FIG. 4 is a view taken along line 4—4 of FIG. 2.

Adjacent one end of each of pins 54 and fitting over adjacent pairs of the pins are fixed slide blocks 56, the fixed slide blocks being locked in position with respect to the pins by snap rings at each side of the slide blocks (see for example FIG. 4). As may be seen in FIGS. 1 and 2 (as well as other figures) the fixed slide blocks 56 are alternately offset so as to allow each of the pins to pass through two separate fixed slide blocks or, stated another way, to allow the support of a fixed slide block for each link of the chain. (These slide blocks are fixed in the sense of not being movable or slideable along the length of pins 54, though of course they do travel with the chain as driven by the drive system hereinbefore described. In the preferred embodiment, the slide blocks are made of a self-lubricating plastic such as Delrin so that the pins may rotate slightly therein as the chains pass around the sprockets.)

Figure 5:
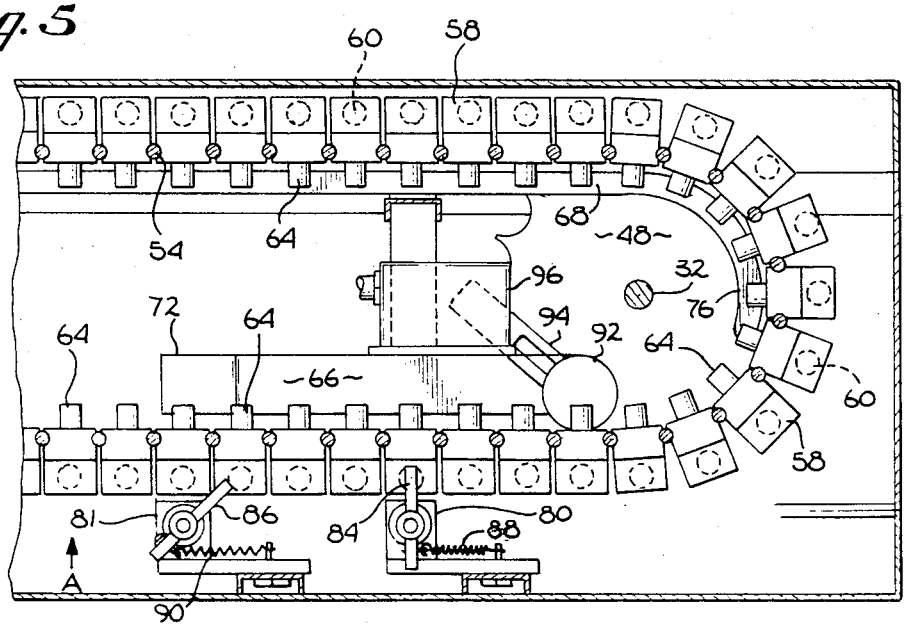
FIG. 5 is a view taken along line 5—5 of FIG. 4.

Also visible in FIG. 4 and better seen in FIG. 5, which is a view looking along line 5—5 of FIG. 4, are the movable slide blocks 58. These slide blocks span the space between two adjacent rods 54, sliding on the rods by a contact therewith over a span of somewhat less than 180 degrees so as to allow a movable slide block to be positioned between each pair of rods 54 as shown. Each of the movable slide blocks have a pusher rod 60 pressed therein, the pusher rod slideably passing through a hole in a companion fixed slide block 56 so that when in the position shown in FIG. 4 (i.e., the retracted position), the end of the pusher member is approximately disposed over chain 52 and over the top surface of conveyor 22. The outer end of each of the pusher members 60 has an appropriate rubber or rubber-like cap 62 thereon to engage an article such as container 20 on the conveyor 22 to push the article aside when the pusher member is extended as illustrated in phantom in FIG. 4. In addition, each of the movable slide blocks 58 have a downward projecting pin 64 pressed therein which, as shall subsequently be described in greater detail, provides a basis of the control of the pusher members in the system. Pins 64, hereinafter referred to as pins, are preferably a pin with a small Delrin wheel or roller thereon for reduction of friction and wear.

The rubber tip 62 is shown in the figures as having a generally short cylindrical outer configuration for simplicity. However, preferably the tip has a configuration as shown in FIG. 13. As shown, the tip is characterized as having a rather broad face 63, a relatively small neck region 65 and a cylindrical region 67 for pressing onto the end of pusher bars 60. Each tip is vented so as to not form a suction cup to stick to an article being transferred. With this configuration neck region 65 may deflect and rotate so that the face 63 may better engage and conform to the surface of the article being pushed.

Now referring again to FIG. 3, which is a view taken along line 3—3 of FIG. 1, further details of the mechanical structure may be seen. The view in FIG. 3 is taken just below the top run of the chains to reveal the fixed guides for the pins 64. Of course, also visible in this figure is the lower span of fixed slide blocks 56 and the lower span of moveable slide blocks 58 with pins 64 therein. Pins 64 for the upper span or run of the chain would also normally be visible in cross section in the view of FIG. 3, though have been omitted except for the pins representing the pusher members which are being extended.

As may be seen in FIG. 3, this embodiment includes three pin guide members, a lower guide member 66 for limiting the extent of initial extension of the pusher members, an upper extension guide member 68 and an upper retraction guide member 70. The lower guide member 66 has an inclined end 72 thereon which will intercept the pin 64 on any of the movable slide blocks which for any reason has been excessively extended during the lower or return run of the pusher members, and will return the movable slide block to a predetermined, only slightly extended position. Thus in general, the lower movable slide blocks 58 will either have their pins 64 in an unextended position as most of the pins are shown in FIG. 3, so as to be aligned to pass on one side of the leading edge 76 of the upper extension guide member 68 and not intercept that guide member, or the pusher members and pins will be slightly extended as confined by lower guide member 66, so that the pins 64 will pass on the opposite side of the leading edge 76 of the upper extension guide member 68 to intercept that guide member and be forced by the guide member to a pusher member extended position at the trailing edge 78 of the upper extension guide member 68. The extension of the pusher members in this manner is further illustrated in FIGS. 2 and 4. After leaving the trailing edge 78 of the upper extension guide member, the pins on the movable slide block of the extended pusher members engage upper retraction guide member 70 so as to retract the pusher members before the chain supporting those pusher members proceeds around the sprockets at the end of the conveyor-like apparatus. The relative positions of the upper extension guide member 68 and the leading edge 76 thereof, as well as the lower guide member 66, may perhaps best be seen in FIG. 8. The relative positions of the pusher members, frame 28 and other parts may also be seen in FIG. 9.

Now referring to FIG. 4 again, some of the details of the actuator for providing an initial extension of the pusher members 60 may be seen. In particular, a small air cylinder 80 is disposed below the lower run of the conveyor-like apparatus, with the actuator rod 82 having a cleat 84 thereon extending upward so as to engage one of the movable slide blocks 58 when the actuator is actuated, as specifically illustrated in FIG. 6. Air under pressure is provided to the actuator from a solenoid valve triggered by a microprocess or control system which shall subsequently be described.

Before proceeding with a further description of the operation of actuator 80, it is worth noting at this point the typical dynamics of an actuator, whether an air powered actuator, such as actuator 80, a solenoid actuator, a solenoid valve controlling a pressure or vacuum actuator, or other typical actuation devices. If upon initiation of the actuator, a constant force is created on the moving member, the moving member will accelerate at a constant rate from the fully unactuated position to the fully actuated position. Consequently, on initiation of this hypothetical actuator, the velocity of the moving member will linearly increase with time from zero to a maximum velocity when it reaches the actuated position. The distance travel at any time between the unactuated and the actuated positions will be proportional to the square of the time since initiation of actuation, with the result that only one-fourth of the actuator motion occurs during the first half of the required actuation time, with the other three-fourths of the motion occuring during the remaining one-half of the actuation time. In real actuators, the force frequently increases with time so that 20% or less of the actuator motion occurs during the first half of the actuation time, with the remaining 80% or more occuring during the second half of the actuation time. By way of specific example, when one first applies an actuation voltage to the coil of a solenoid actuator, the current in the coil must build up to the point where the magnetic force exceeds the return spring force before any motion of the actuator occurs. Even after that point, the field will continue to rise with time so that the acceleration of the moving member, rather than being constant during the actuation time, actually increases from zero sometime after actuation is initiated, to a maximum just as the moving member reaches the actuated position. Typically the delays caused by the inductance of the solenoid actuator and the mechanics of the motion of the moving member result in an actuation time of a solenoid actuator on the order of 10 to 20 milliseconds or longer, of which the initial portion may generally be considered as a pure delay, with the effective portion of the motion occuring toward the end of the required actuation time. Release of a typical solenoid actuator is similar in that the magnetic field holding the moving member in the latched position cannot instantly collapse, and accordingly the acceleration of the moving member toward the unlatched position as a result of the return spring typically increases with time as the field more gradually collapses.

In air powered actuators somewhat similar affects occur, as the pressure within the actuator cannot instantly increase to the maximum actuation pressure upon initiation of actuation. Obviously an air powered device also must be controlled through some air supply control device such as a solenoid valve, each of which will impose its dynamics on the overall combination. In any event, from the foregoing discussion, it may be seen that the response of a typical actuator to an actuation command may be approximated as a pure time delay, followed by a time within which the useful motion of the actuator will occur. With these characteristics in mind, references will now be made to FIGS. 5 and 8. In those figures it will be noted that there are actually two actuators in this embodiment, specifically actuators 80 and 81. Also, it will be noted that the cleat 84 coupled to the actuator rod of actuator 80, as well as the cleat 86 coupled to the actuator rod of actuator 81, are rotatable against the force of return springs 88 and 90. This arrangement has a number of unique advantages as hereafter described.

Figure 6:
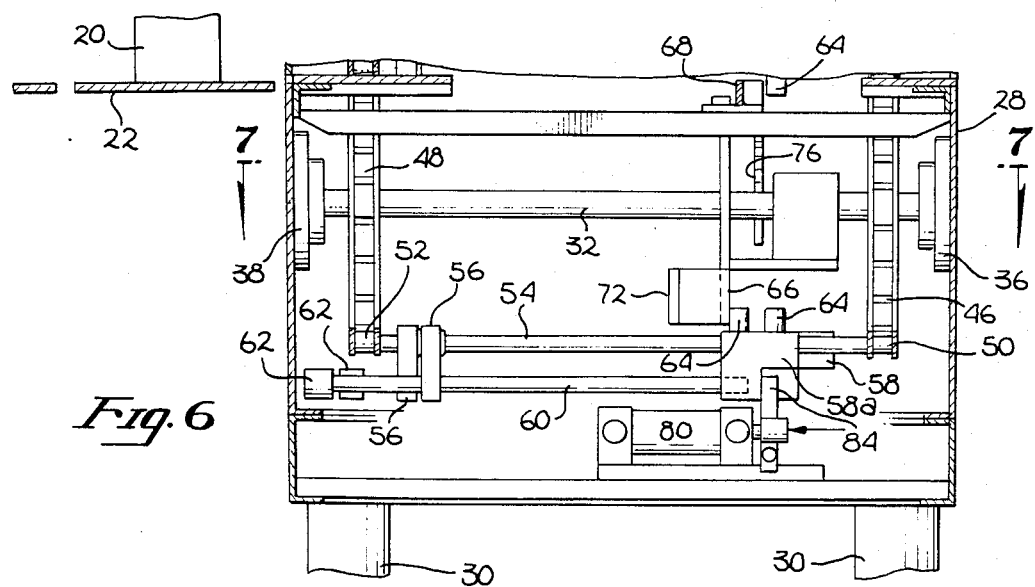
FIG. 6 is a view similar to FIG. 4 illustrating actuator 80 in the actuated condition.
Figure 7:
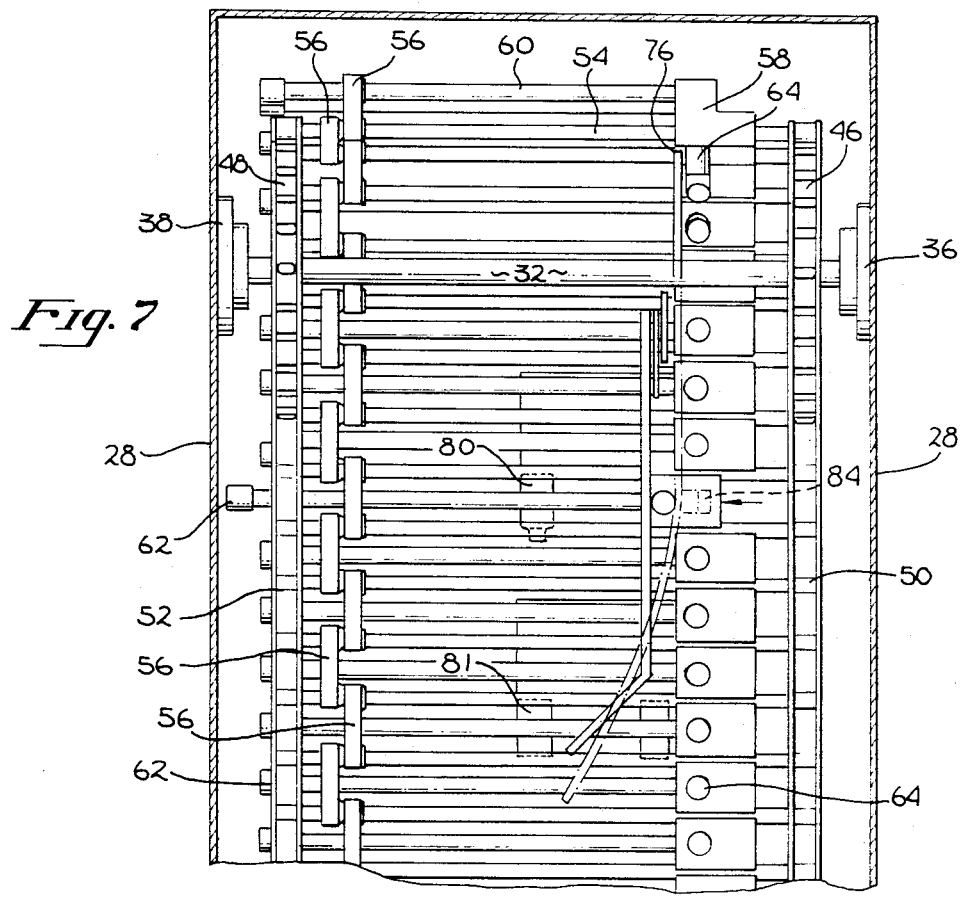
FIG. 7 is a view taken along line 7—7- of FIG. 6.

In FIG. 6 a view similar to FIG. 4 is shown, though in this figure, actuator 80 is shown in the actuated position. Thus cleat 84 has engaged and moved one of the movable slide blocks 58, specifically slide block 58a, to the left, the motion to the left being limited by the interception of pin 64a thereon by the lower guide member 66. This is illustrated also in FIG. 7 which is a view taken along line 7—7 of FIG. 6. It will be noted in both of these figures and in FIG. 9 that the frame structure 28 provides sufficient clearance for the somewhat extended pushrods, guide member 66 assuring this clearance by limiting the initial extension thereof.

Figure 8:
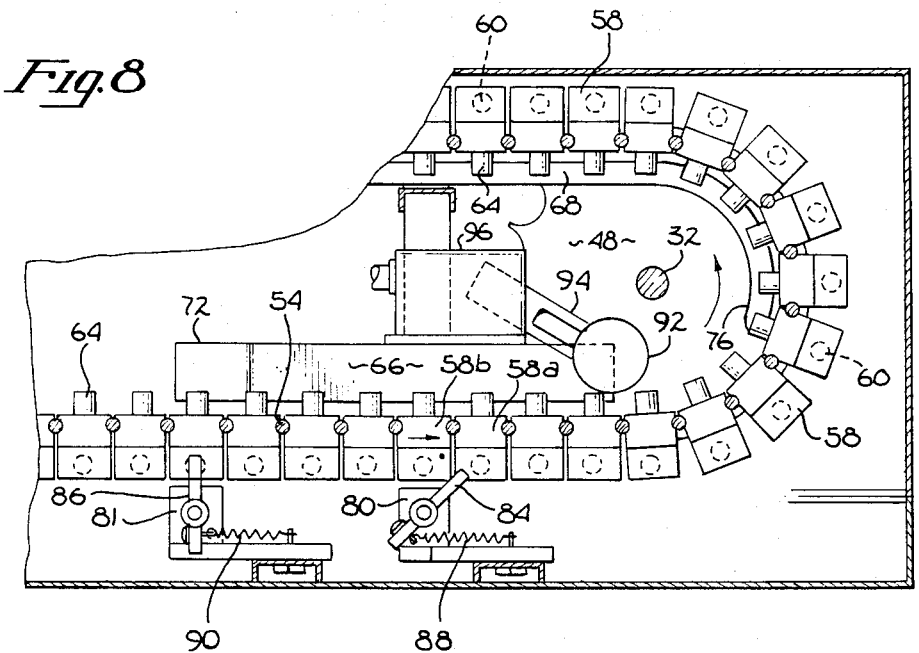
FIG. 8 is a view similar to FIG. 5 which together with FIG. 5 illustrates the alternate operation of the actuators 80 and 81.
Figure 9:
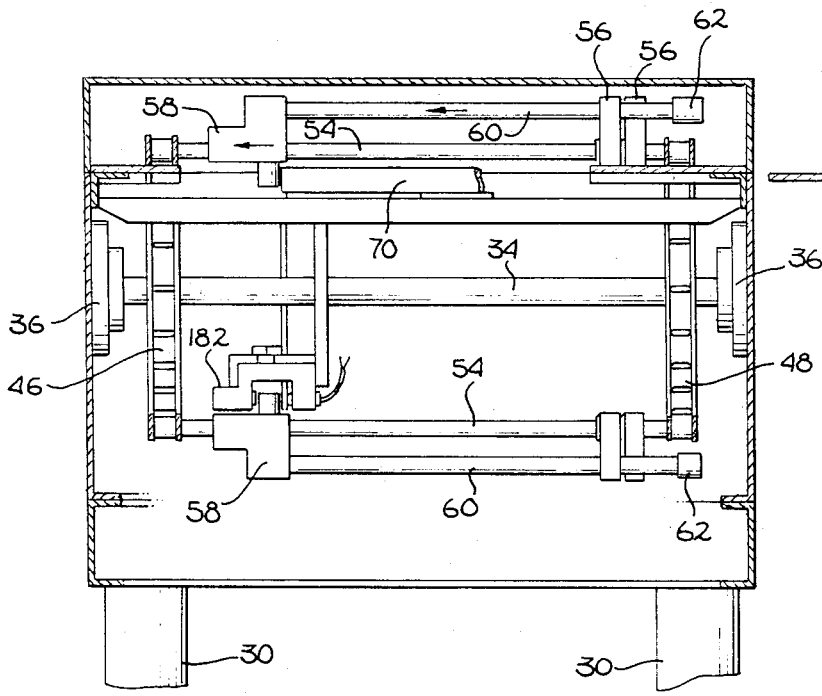
FIG. 9 is a view illustrating the typical mounting of sensors 101 and 103, specifically sensor 103.

When actuated, as shown in FIG. 6, cleat 84 may intercept the path of the next undeflected slide block 58, and unless returned to the unactuated position shown in FIG. 4 before the leading edge of the next slide block arrives at the cleat position, the cleat will collide with that next slide block. Thus one of the advantages of the deflectable cleat 84 is illustrated in FIG. 8. In particular, in this figure, it is presumed that movable slide block 58a has been deflected but that the actuator has not yet entirely returned to the unactuated position so that cleat 84 is engaging the leading edge of slide block 58b. Thus, as shown, the cleat may deflect out of the way to prevent damage to any part of the mechanism. In a low speed machine the condition of cleat 84, illustrated in FIG. 8, generally would be the result of some type of failure, such as by way of example, a sticky actuator, a faulty solenoid valve, improper adjustment of the system, etc. In this manner protection is provided against a minor problem escalating into a more major problem.

In high speed machines the deflectable cleat may be intentionally used to overcome the actuation time limitations of the actuator itself. In particular, in FIGS. 5 and 8, two actuators, specifically actuators 80 and 81 are shown. For ease of control these actuators are spaced apart some multiple of the spacing between bars 54 and more preferably, are spaced apart with an odd number of slide blocks 58 therebetween. With this arrangement, each of the actuators 80 and 81 may be used to deflect alternate pusher bar assemblies, so that at the maximum each pusher bar assembly may be actuated and yet each actuator need only run one-half as fast as the overall system. In that regard, for such high-speed applications, each actuator is preferably controlled so as to eliminate the effects of the fixed time delay characteristic of actuators hereinbefore described, specifically by initiating the actuation cycle slightly ahead of the arrival of the slide bar assembly to be extended by an amount dependent upon the current operating speed of the system.

As an additional safety feature, a means is provided to shut the system down in the event of a mispositioning of a pusher bar assembly so that the problem may be corrected and damage to the system avoided. In particular, a narrow roller or wheel 92 is supported on the actuating lever 94 of a switch 96, the switch being operative to actuate the clutch 44 and brake 45 (FIG. 3) to quickly stop the mechanism. The wheel 92 is directly aligned with the leading edge 76 of the upper extension guide member 68. Consequently, if for any reason one of the pusher bar assemblies is only partially initially extended by an actuator, or for any other reason is in a position so that its pin 64 would otherwise intercept the end 76 of the guide member 68, resulting in damage to the system, the respective pin will first engage wheel 92 to actuate switch 96 and shut down the system before the pin reaches the end of guide member 68. Thus again, a malfunction will be quickly detected and the problem corrected before damage to the system as a result of the malfunction occurs.

Figure 10A:
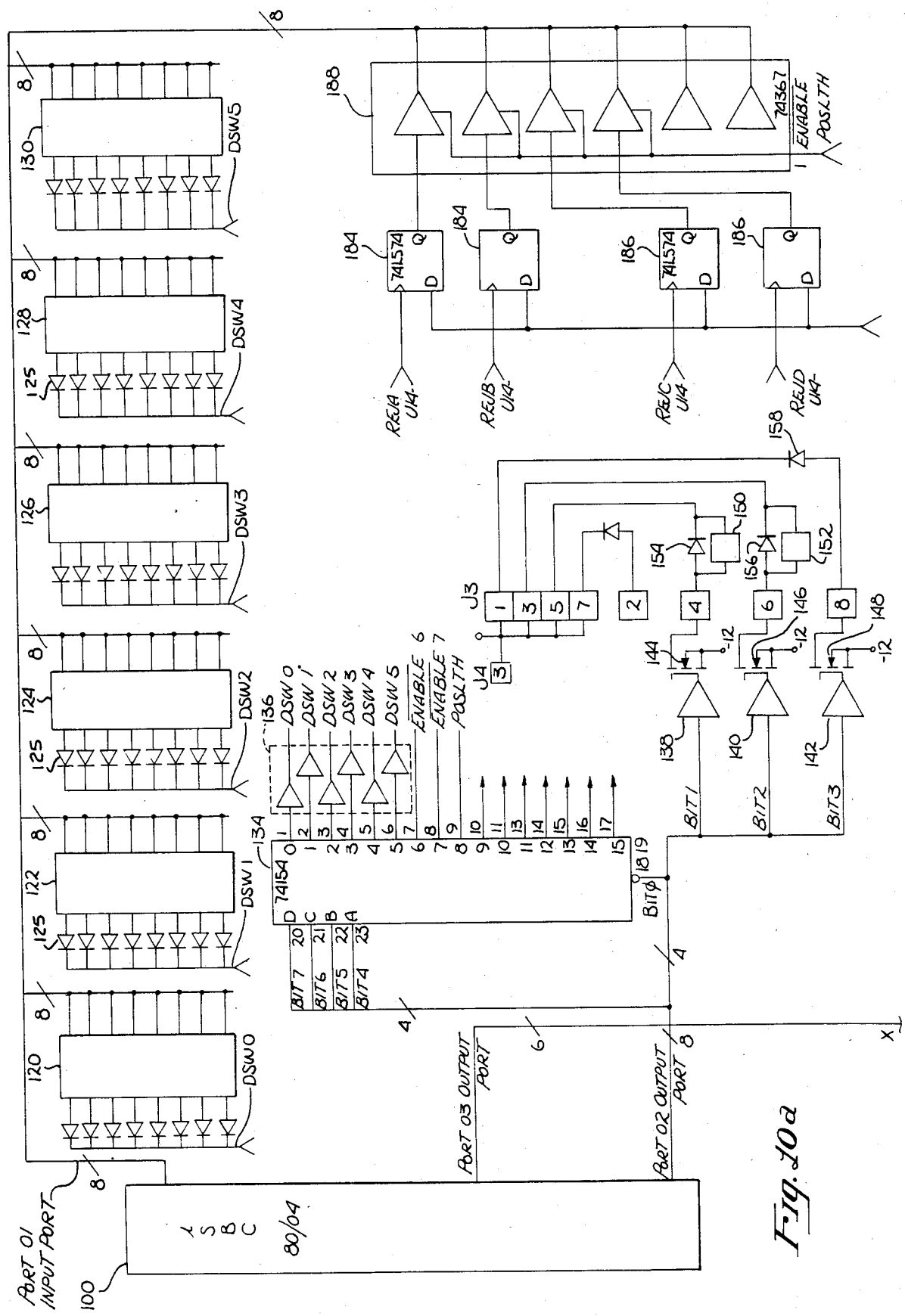
FIGS. 10a and 10b are circuit diagrams illustrating part of the single board computer interface circuitry.
Figure 10B:
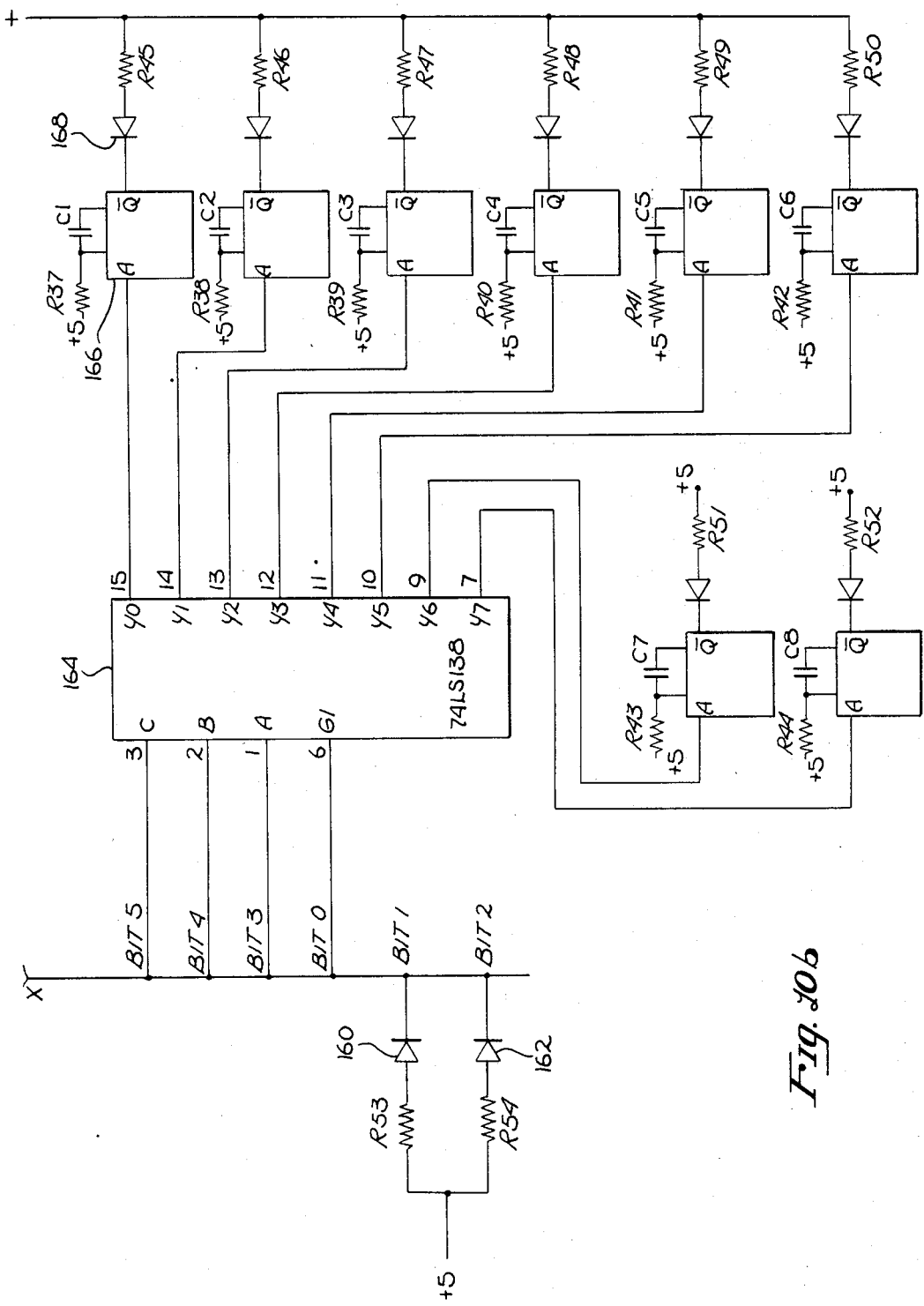

Now referring to FIGS. 10 and 11, the electronic portion of the system may be seen. As shown in FIG. 10, the system is controlled under program control by a single board computer 100, specifically in the preferred embodiment an iSBC 80/04 single board computer, manufactured and sold by Intel Corporation. The circuitry shown in detail in FIG. 10 connects to the 3 ports, specifically port 01, port 02 and port 03 of the 80/04 available through the J1 connector of the computer. The specific pin designations for the J1 connector for these three ports are shown in the Intel product literature on this computer. Note that on this computer, ports 01 and 02 are 8 bit I/O ports, whereas port 03 is a 6 bit I/O port. In the specific circuitry to be described, port 01 is used as an input port, whereas ports 02 and 03 are used as output ports for the computer.

In the preferred embodiment, provision has been made in the electronics to allow for expanded capabilities at a later time, dependent upon specific applications of the system. Thus, as shall be shown herein, the capability of receiving and operating on 12 separate input signals has been provided in this embodiment, even though a lesser number are actually used with the specific system disclosed in FIGS. 1 through 9. Each of the 12 input signals or channels utilizes an input interface, a typical circuit for which is shown in FIG. 12. The J2 connector shown therein is intended, for each channel, for connection to a respective signal source. By way of specific example, as is obvious from the previous description of a typical embodiment, one of the inputs for this embodiment will be a rejection signal from the inspection station. The input for a typical input interface is coupled through a transistor 102 to a current regulator 104, specifically an LM334, manufactured by National Semiconductor, with the combination of transistor 102, current regulator 104 and resistor 106 providing a current regulation independent of a relatively wide range of input voltage on connector J2 so as to provide a substantially constant current to the light emitter in the optoisolator 108. The output of the optoisolator is made TTL compatible by pull-up resistor 110 coupled to a five volt supply, with the output on line 112 being the inverted logic signal of the control signal applied to connector J2. By using the combination of the current regulator and the optoisolator, TTL compatible signals are provided which are electrically isolated from the source of the input signal and which are responsive to input signals of a wide range of voltages to allow direct connection to almost any signal source without requiring further interfacing. In the preferred embodiment, an input voltage range of 4 to 40 volts DC can be accommodated by the circuit of FIG. 12.

The 12 individual outputs of the interface of FIG. 12 are each coupled to one respective input of the pair of hex Schmitt triggers 114, the Schmitt triggers providing buffering, reinversion and hysteresis in the 12 signals. The outputs of the Schmitt triggers are coupled to the inputs of a pair of hex tristate drivers 116, 8 of which are enabled by an enable signal $\overline{\text{ENABLE}}$ 6 on line 118 and the remaining 4 of which are enabled by an enable signal $\overline{\text{ENABLE}}$ 7 on line 120. Thus, on receipt of an enable signal on line 118, the outputs of 8 of the tristate drivers are coupled to the eight lines of port 01 of the single board computer 100, whereas an enable signal on line 120 couples the remaining 4 tristate drivers to 4 of the lines of port 01.

In the preferred embodiment, only 6 of the 12 input channels are used, the remaining 6 allowing for subsequent expansion if and when such expansion becomes necessary. The 6 channels which are used comprise 4 reject signal channels (all 4 not necessarily being used in all systems), a trigger input and a position latch input.

These signals are identified herein as REJA, REJB, REJC, REJD, TRIG and POS, respectively.

Now referring again to FIG. 10, it will be noted that there are 6 separate eight position dip switches 120, 122, 124, 126, 128 and 130, coupled in parallel to port 01 of the computer. Each of the dip switches has an input line 132 thereof coupled in parallel with the switches therein. By grounding the input line for a respective dip switch, the condition of the switches may be read by the computer through port 01. For this purpose, 4 of the 8 bits of the output of port 02 are coupled to a one of 16 decoder 134, with the first 6 of the decoded outputs being buffered by hex amplifier 136 to provide the 6 "enable" signals for the 6 dip switches. The I/O lines of the computer have a pullup resistor when used as input lines, and accordingly a dip switch is enabled by pulling its input low. Also diodes 125 prevent coupling between switches so that the state of the articles in any one dip switch can be tested by the computer, independent of any of the other switches. Three of the remaining outputs of the decoder 134 are used for the enable signals for lines 118 and 119 (FIG. 11), specifically $\overline{\text{ENABLE 6}}$ and $\overline{\text{ENABLE 7}}$, and as the position latch signal POSLTH, the function of which is yet to be described.

Of the other 4 lines of port 02, one of the 4 is coupled to pins 18 and 19 of the 74LS154 decoder 134 for control of the decoder, whereas the remaining 3 are buffered through amplifiers 138, 140 and 142 and used to control VMOSFET's 144, 146 and 148 respectively, with VMOSFET's 144 and 146 being used to control the solenoid valves 150 and 152 respectively, in turn controlling the actuators 80 and 81 (see for example FIGS. 5 and 8). The solenoid valves themselves have one line coupled to a +24 volt supply with the VMOSFETs being effective to pull the other line to ground to turn on the solenoid valve. Diodes 154 and 156 (and 158 if a third actuator is used) are used to confine the inductive spike on turning off the VMOSFETs so that the inductive kick does not damage the circuitry.

As shown in FIG. 10, port 03 has 2 bits thereof controlling LEDs 160 and 162, which may be used to indicate status or some other parameter or condition within the system. The other 4 bits of this port are applied to a one of 8 decoder 164, three of which are applied as coded signals and the fourth of which is applied as the enable to provide 8 decoded signals, each of which is buffered by retriggerable one shots 166 to drive additional indicating LEDs 168. In the embodiment described herein, these LEDs have not been used for any particular indicating purposes though may readily be implemeneted for local or remote indication as any particular application may make desirable.

Before describing the remaining portions of FIG. 10, it should be pointed out that in the preferred embodiment of the present invention there are two photodetectors shown in FIG. 3 for sensing the position of the pusher members, specifically by sensing the position of the pins 64. One of these sensors, specifically sensor 170, is used to sense the leading edge of each pin, and as shall subsequently be seen, used to determine when the actuators should be actuated to properly intercept and move a selected pusher bar assembly. The other sensor, specifically sensor 182, is positioned so that its state may be checked when a reject signal is received to determined whether a pusher member will be centered on the article to be rejected so that the article may be properly rejected by a single pusher member, or whether pusher members fall on each side of the center of the article so that the article would be better and more reliably rejected by the extension of two adjacent pusher members. Of course, other types of sensors may be used, as desired, to sense position, such as by way of example, a shaft encoder mounted on one of the sprocket shafts or otherwise synced to the motion of the conveyor system.

The output signal of sensor 180 is used as a trigger signal TRIG, hereinbefore referred to as one of the inputs of an input interface circuit typically shown in FIG. 12. The output of sensor 182 is used as the position signal POS, also hereinbefore referred to, and is also applied to one of the input interface circuits as the input thereof. The TTL compatible signals are REJA, REJB, REJC, REJD, and POS on the output of one of the hex inverters 114 are also applied to the dual D flip-flops 184 and 186, REJA, REJB, REJC and REJD being applied as the clock inputs thereto, and the signal POS being applied as the D input. The Q outputs of the flip-flops are coupled through four amplifiers of a hex tristate driver 188 to four lines of port 01 (the port used as the input port on computer 100). In effect, the position signal POS, as a result of proper positioning of the photo sensor 182, is a signal alternating between high and low states, indicating whether a single pusher bar or two pusher bars should be actuated to accomplish the rejection of a particular article on the conveyor, and is effectively clocked into any of the flip-flops 184 and 186 upon the receipt of any of the four rejection signals. After receipt of one of the rejection signals, the state of the flip-flops will be read through the tristate driver 188 by enabling the drivers through the position latch output POSLTH and reading the state of the tristate driver outputs on the input port lines (port 01).

Having now described the electronics and details of the operation thereof, an overview of the system operation will now be given in order to better integrate the function and intercooperation of the various assemblies hereinbefore described in detail. The six dip switches DSW0 through DSW5 provide a manual programming means for entering various system characteristics and commands as appropriate for any particular installation. As shown in FIG. 10a, each of the dip switches are coupled in parallel to port 01 of the computer 100, the individual switches being in series with an appropriate coupling device (diodes being shown in FIG. 10a) so that switch settings of one switch do not feed back to the other switches. Dip switch DSW0 provides the A DELAY representing the desired delay between the receipt of a reject signal REJA on channel A and the desired actuation of the actuators to initiate motion of one or more pusher bar assemblies. The desired delay count is entered as a binary number onto the dip switch, the binary number representing the number of pins 64 for the delay. Dip switches DSW1 through DSW3 are similar, representing the delays for the additional channels B through D, i.e., for the reject signals REJB, REJC and REJD. In this manner, one of the unique features of the invention is achieved. In particular, by allowing for multiple rejection signals, each having a manually settable delay, the system of the present invention will respond to rejection signals from any of a series of upstream rejection devices so as to transfer the inspected article when it reaches the system of the present invention in response to one (or more) of the rejection signals. This allows a plurality of successive accept-reject decisions for each article as it proceeds along conveyor 22, with the physical removal of the rejected article for any reject decisions being achieved in the one transfer system of the present invention.

Dip switch DSW4 sets a shift register output byte to allow the user to select the rod pattern that best suits his particular line. Position one of this switch controls the first available rod, if this switch is set ON, the rod is activated. Position two, on the other hand, controls the rod succeeding the first available rod, with positions three through eight controlling the next six rods. Thus the system of the present invention may be used to reject items other than individual containers such as, by way of example, a six pack, or items of other substantial longitudinal extent, as a plurality of rods, appropriately timed, may be extended to properly push such an article off of the conveyor.

There are two exceptions to the foregoing switch settings for dip switch DSW4. In particular, if all switches of this dip switch are set to the OFF position, only the first available rod will be activated. On the other hand, if only the first switch is ON and all the other switches are OFF, either the first and second available rods are activated, or only the second available rod is activated, depending on the relative position of the container with respect to the rods as sensed by sensors 101 and 103 (see FIGS. 3 and 9), which sensors are photoelectric sensing the passage of each of pins 64 thereby. In that regard, it will be noted that sensors 101 and 103 are staggered as opposed to having a separation equal to an interval number of pin spaces, so that they alternately sense the passage of the pins. One of these sensors is used to provide the trigger signal TRIG hereinbefore described, whereas the other sensor is used to provide the position latch signal, the position latch signal being the signal which determines the position of the pins and thus the pusher bar assemblies at the moment each reject signal is received, as also hereinbefore described.

Finally, dip switch DSW5 is referred to as a system control switch. Position one is set ON for a two solenoid machine and is set OFF for a one solenoid machine, i.e., a machine not having both actuators 80 and 81, but only one such actuator. A two solenoid machine may be set to operate in the one solenoid mode and run at half speed in the event one of its solenoid fails for any reason.

At the moment a reject signal is received the position of the rods relative to the article to be rejected as indicated by that rejection signal is obtained from the photoelectric providing the position latch signal. This signal is latched at the time of the reject and read into the computer by sending its address out port 02 and inputting data on port 01. Based upon this information and the setting of the dip switches as hereinbefore described, the system is fully operative to push the rejected article off the main conveyor when it proceeds from the position of reject to the conveyor for removal therefrom.

It may be seen from the foregoing that a highly versatile rejector has been described wherein any one of a plurality of reject signals may be received from various positions upstream of the rejector in order to affect rejection of the article by one, two or more rejector bars, with one mode of operation being the extension of one or two pusher bar assemblies depending upon whether one pusher bar is directly in line with the article to be rejected to force the article off the conveyor, or whether the system is positioned such that two should be extended to push each side of the article to assure proper rejection. By very simple system controls, more than two may be extended to reject an article as may be used for the rejection of articles having a greater longitudinal extent on the conveyor containing the articles to be rejected.

One very important aspect of the present invention has been mentioned, though not yet described in full detail. In particular, the time delay of actuators in general has been described and the value of two actuators recognized so as to allow for higher speed operation than one actuator is capable of. This speed capability is further extended by appropriate control of the actuators under program control of the single board computer. In particular, it was previously mentioned with respect to the description of dip switches DSW0 through DSW3 that these switches represent the desired time delay between the receipt of a respective reject signal and the initiation of motion of any of the pusher bar assemblies by the actuators. Actually for this aspect of the invention, the time delay for each channel is selected to be a binary number equal to the number of pins 64 that will pass a reference point somewhat upstream of actuator 81, such as reference point A (see FIG. 5) before the specific pin 64 reaches reference point A for the pusher bar assembly or the first of a series of pusher bar assemblies which are to be activated by one of actuators 80 or 81. The computer itself is preferably programmed to recognize that it must itself impose an additional delay depending upon whether actuator 80 or 81 is to be used to initiate the motion of the pusher bar assembly then at reference point A. By way of example, when operating at low speed, if actuator 81 is the actuator to initiate motion of the pusher bar assembly at reference point A, an additional two pin delay will be imposed by the computer before actuation of the actuator 81. If instead actuator 80 is the one to initiate the motion of the pusher bar assembly, an additional delay of six pins rather than two pins is to be imposed by the computer. Most importantly however, the computer is programmed to recognize the current operating speed of the machine by monitoring the repetition rate of the signals from one of photoelectric sensors 101 and 103 so as to be able to compensate for the fixed time delay of the solenoid valve—actuator combination, hereinbefore described, during which no useful motion of the actuator occurs. By way of example, as the speed of the machine is increased, the computer imposed delays of two pins for actuator 81 and six pins for actuator 80 may be reduced somewhat so that the entire useful motion of the respective actuator occurs when desired, as opposed to somewhat later than desired in the high speed machine. At a particular speed the fixed time delay of the actuator system may represent a conveyor motion equivalent to half the distance between adjacent pins 64. Thus the fixed time delay at that particular speed of the system represents a position delay of one-half of the spacing between pusher bar assemblies. Accordingly, the computer can readily make up for this delay by advancing the firing of the solenoid valves controlling actuators 80 and 81, specifically by firing the solenoid valve controlling actuator 81 only one and one-half pins later rather than a full two pins, and by firing the solenoid valve controlling actuator 80 only five and one-half pins later rather than six pins later. Obviously the algorithm for this advance in firing is relatively simple, as the advance in firing will usually be directly proportional to system speed, though more complicated tailoring of the advance in firing may be done if desired by either using a more involved algorithm or by precomputing a fixed look-up table and looking up the advance based upon current speed. Thus whatever method is used, the computer may automatically compensate for the time delay characteristic of the actuators by progressively advancing (i.e., reducing the delay) the initiation of the actuators with increasing speed, whereby the highest possible speed of operation may be obtained. In that regard, extension guide 68 is preferably contoured to initially engage the article to be removed from the cnveyor with a relatively low velocity, initially accelerate rapidly and then deaccelerate smoothly, thereby initially engaging the article with minimum impact, rapidly moving it off of conveyor 22 and slowing to avoid "overshoot" of the article beyond or against the side of the rejected article conveyor 26.

There has been described herein a new an unique selective transfer apparatus capable of particularly high speed to provide for the smooth selective transfer of articles based upon one or more input signals thereto. A program for operation of the system described is attached hereto as Exhibit 1. While the system has been described with respect to certain preferred embodiments thereof, it will be understood by those skilled in the art that various changes in form and detail may be made therein without departing from the spirit and scope of the invention.

```
OP CODE FOR SFREJ
MNEMONIC ERROR
EM 0000
0000  C3      0043  CD      0086  3F      00C9  DB
0001  40      0044  65      0087  3E      00CA  01
0002  00      0045  01      0088  20      00CB  2F
0003  00      0046  3E      0089  D3      00CC  57
0004  00      0047  40      008A  02      00CD  78
0005  00      0048  D3      008B  47      00CE  D3
0006  00      0049  00      008C  3C      00CF  02
0007  00      004A  3E      008D  D3      00D0  CD
0008  00      004B  3D      008E  02      00D1  76
0009  00      004C  D3      008F  DB      00D2  01
000A  00      004D  04      0090  01      00D3  22
000B  00      004E  3E      0091  2F      00D4  23
000C  00      004F  C0      0092  57      00D5  3F
000D  00      0050  D3      0093  78      00D6  3E
000E  00      0051  05      0094  D3      00D7  10
000F  00      0052  CD      0095  02      00D8  D3
0010  00      0053  3E      0096  CD      00D9  02
0011  00      0054  01      0097  76      00DA  47
0012  00      0055  3E      0098  01      00DB  3C
0013  00      0056  00      0099  22      00DC  D3
0014  00      0057  D3      009A  20      00DD  02
0015  00      0058  02      009B  3F      00DE  DB
0016  00      0059  47      009C  EB      00DF  01
0017  00      005A  3C      009D  22      00E0  2F
0018  00      005B  D3      009E  31      00E1  57
0019  00      005C  02      009F  3F      00E2  78
001A  00      005D  DB      00A0  3E      00E3  D3
001B  00      005E  01      00A1  30      00E4  02
001C  00      005F  2F      00A2  D3      00E5  CD
001D  00      0060  57      00A3  02      00E6  76
001E  00      0061  78      00A4  47      00E7  01
001F  00      0062  D3      00A5  3C      00E8  22
0020  00      0063  02      00A6  D3      00E9  29
0021  00      0064  CD      00A7  02      00EA  3F
0022  00      0065  76      00A8  DB      00EB  3E
0023  00      0066  01      00A9  01      00EC  20
0024  C3      0067  22      00AA  2F      00ED  D3
0025  40      0068  21      00AB  57      00EE  02
0026  00      0069  3F      00AC  78      00EF  47
0027  00      006A  EB      00AD  D3      00F0  3C
0028  00      006B  22      00AE  02      00F1  D3
0029  00      006C  25      00AF  CD      00F2  02
002A  00      006D  3F      00B0  76      00F3  DB
002B  00      006E  3E      00B1  01      00F4  01
```

| | | | | | | | |
|---|---|---|---|---|---|---|---|
| 002C | 00 | 006F | 10 | 00B2 | 22 | 00F5 | 2F |
| 002D | 00 | 0070 | D3 | 00B3 | 33 | 00F6 | 57 |
| 002E | 00 | 0071 | 02 | 00B4 | 3F | 00F7 | 78 |
| 002F | 00 | 0072 | 47 | 00B5 | EB | 00F8 | D3 |
| 0030 | 00 | 0073 | 3C | 00B6 | 22 | 00F9 | 02 |
| 0031 | 00 | 0074 | D3 | 00B7 | 37 | 00FA | CD |
| 0032 | 00 | 0075 | 02 | 00B8 | 3F | 00FB | 76 |
| 0033 | 00 | 0076 | DB | 00B9 | 3A | 00FC | 01 |
| 0034 | 00 | 0077 | 01 | 00BA | 20 | 00FD | 22 |
| 0035 | 00 | 0078 | 2F | 00BB | 3F | 00FE | 2F |
| 0036 | 00 | 0079 | 57 | 00BC | E6 | 00FF | 3F |
| 0037 | 00 | 007A | 78 | 00BD | 01 | 0100 | 3E |
| 0038 | 00 | 007B | D3 | 00BE | CA | 0101 | 30 |
| 0039 | 00 | 007C | 02 | 00BF | 15 | 0102 | D3 |
| 003A | 00 | 007D | CD | 00C0 | 01 | 0103 | 02 |
| 003B | 00 | 007E | 76 | 00C1 | 0D | 0104 | 47 |
| 003C | C3 | 007F | 01 | 00C2 | 78 | 0105 | 3C |
| 003D | 08 | 0080 | 22 | 00C3 | D3 | 0106 | D3 |
| 003E | 02 | 0081 | 27 | 00C4 | 02 | 0107 | 02 |
| 003F | 00 | 0082 | 3F | 00C5 | 47 | 0108 | DB |
| 0040 | 31 | 0083 | EB | 00C6 | 3C | 0109 | 01 |
| 0041 | FF | 0084 | 22 | 00C7 | D3 | 010A | 2F |
| 0042 | 3F | 0085 | 28 | 00C8 | 02 | 010B | 57 |
| 010C | 78 | 014B | D3 | 018A | 01 | 01C9 | 1F |
| 010D | D3 | 014C | 02 | 018B | 68 | 01CA | DA |
| 010E | 02 | 014D | 79 | 018C | 7A | 01CB | EF |
| 010F | CD | 014E | FE | 018D | E6 | 01CC | 01 |
| 0110 | 76 | 014F | 01 | 018E | F8 | 01CD | 3A |
| 0111 | 01 | 0150 | C2 | 018F | 1F | 01CE | 3A |
| 0112 | 22 | 0151 | 5E | 0190 | 1F | 01CF | 3F |
| 0113 | 2F | 0152 | 01 | 0191 | 1F | 01D0 | 1F |
| 0114 | 3F | 0153 | 3A | 0192 | 11 | 01D1 | 7E |
| 0115 | 3E | 0154 | 20 | 0193 | 00 | 01D2 | F6 |
| 0116 | 50 | 0155 | 3F | 0194 | 3F | 01D3 | 10 |
| 0117 | D3 | 0156 | F6 | 0195 | 83 | 01D4 | 77 |
| 0118 | 02 | 0157 | 01 | 0196 | 5F | 01D5 | 21 |
| 0119 | 47 | 0158 | 32 | 0197 | 7A | 01D6 | 3C |
| 011A | 3C | 0159 | 20 | 0198 | CE | 01D7 | 3F |
| 011B | D3 | 015A | 3F | 0199 | 00 | 01D8 | 7E |
| 011C | 02 | 015B | 0E | 019A | 57 | 01D9 | 1F |
| 011D | DB | 015C | 03 | 019B | C9 | 01DA | D0 |
| 011E | 01 | 015D | C9 | 019C | 3A | 01DB | 2A |
| 011F | 57 | 015E | 79 | 019D | 43 | 01DC | 3D |
| 0120 | 78 | 015F | FE | 019E | 3F | 01DD | 3F |
| 0121 | D3 | 0160 | 00 | 019F | E0 | 01DE | 22 |
| 0122 | 02 | 0161 | C0 | 01A0 | D3 | 01DF | 41 |
| 0123 | 7A | 0162 | 0E | 01A1 | 03 | 01E0 | 3F |
| 0124 | 32 | 0163 | 01 | 01A2 | 3C | 01E1 | 3A |
| 0125 | 39 | 0164 | C9 | 01A3 | D3 | 01E2 | 3B |
| 0126 | 3F | 0165 | 21 | 01A4 | 03 | 01E3 | 3F |
| 0127 | E6 | 0166 | 00 | 01A5 | 3D | 01E4 | F6 |
| 0128 | 80 | 0167 | 3F | 01A6 | D3 | 01E5 | 80 |
| 0129 | 32 | 0168 | 11 | 01A7 | 03 | 01E6 | 32 |
| 012A | 3A | 0169 | 00 | 01A8 | C9 | 01E7 | 3B |
| 012B | 3F | 016A | 01 | 01A9 | 21 | 01E8 | 3F |
| 012C | 3E | 016B | 06 | 01AA | 20 | 01E9 | 06 |
| 012D | 02 | 016C | 00 | 01AB | 3F | 01EA | 28 |
| 012E | 32 | 016D | 70 | 01AC | 06 | 01EB | CD |
| 012F | 43 | 016E | 23 | 01AD | 21 | 01EC | 9C |
| 0130 | 3F | 016F | 1B | 01AE | AF | 01ED | 01 |

| Addr | Val | Addr | Val | Addr | Val | Addr | Val |
|------|-----|------|-----|------|-----|------|-----|
| 0131 | D3 | 0170 | 7E | 01AF | 7E | 01EE | C9 |
| 0132 | 03 | 0171 | B2 | 01B0 | 1F | 01EF | 2A |
| 0133 | 3E | 0172 | C2 | 01B1 | 77 | 01F0 | 3D |
| 0134 | CE | 0173 | 6D | 01B2 | 1F | 01F1 | 3F |
| 0135 | D3 | 0174 | 01 | 01B3 | 2B | 01F2 | 22 |
| 0136 | 00 | 0175 | C9 | 01B4 | 05 | 01F3 | 3F |
| 0137 | 3E | 0176 | 41 | 01B5 | CA | 01F4 | 3F |
| 0138 | 1B | 0177 | E6 | 01B6 | BC | 01F5 | 3A |
| 0139 | 00 | 0178 | 07 | 01B7 | 01 | 01F6 | 3A |
| 013A | FB | 0179 | C6 | 01B8 | 17 | 01F7 | 3F |
| 013B | C3 | 017A | 02 | 01B9 | C3 | 01F8 | F6 |
| 013C | 05 | 017B | 5F | 01BA | AF | 01F9 | 80 |
| 013D | 02 | 017C | AF | 01BB | 01 | 01FA | 32 |
| 013E | 3E | 017D | 67 | 01BC | 23 | 01FB | 3A |
| 013F | 40 | 017E | 1D | 01BD | C9 | 01FC | 3F |
| 0140 | D3 | 017F | CA | 01BE | 7E | 01FD | 06 |
| 0141 | 02 | 0180 | 8B | 01BF | 1F | 01FE | 20 |
| 0142 | 47 | 0181 | 01 | 01C0 | 21 | 01FF | CD |
| 0143 | 3C | 0182 | 78 | 01C1 | 3C | 0200 | 9C |
| 0144 | D3 | 0183 | 17 | 01C2 | 3F | 0201 | 01 |
| 0145 | 02 | 0184 | 47 | 01C3 | D2 | 0202 | C3 |
| 0146 | DB | 0185 | 7C | 01C4 | D5 | 0203 | D5 |
| 0147 | 01 | 0186 | 17 | 01C5 | 01 | 0204 | 01 |
| 0148 | 2F | 0187 | 67 | 01C6 | 3A | 0205 | 00 |
| 0149 | 4F | 0188 | C3 | 01C7 | 20 | 0206 | 00 |
| 014A | 78 | 0189 | 7E | 01C8 | 3F | 0207 | 00 |
| 0208 | F3 | 0249 | 3F | 028A | 3A | 02CB | B3 |
| 0209 | 3A | 024A | 47 | 028B | 4E | 02CC | 77 |
| 020A | 4D | 024B | 0E | 028C | 3F | 02CD | 23 |
| 020B | 3F | 024C | 01 | 028D | A1 | 02CE | 7E |
| 020C | F6 | 024D | A1 | 028E | CA | 02CF | B2 |
| 020D | 60 | 024E | CA | 028F | 97 | 02D0 | 77 |
| 020E | D3 | 024F | 77 | 0290 | 02 | 02D1 | 0E |
| 020F | 02 | 0250 | 02 | 0291 | 11 | 02D2 | 08 |
| 0210 | 47 | 0251 | 06 | 0292 | 29 | 02D3 | 78 |
| 0211 | 3C | 0252 | 00 | 0293 | 3F | 02D4 | A1 |
| 0212 | D3 | 0253 | CD | 0294 | C3 | 02D5 | CA |
| 0213 | 02 | 0254 | 9C | 0295 | 9A | 02D6 | 05 |
| 0214 | DB | 0255 | 01 | 0296 | 02 | 02D7 | 02 |
| 0215 | 01 | 0256 | 3A | 0297 | 11 | 02D8 | 06 |
| 0216 | 4F | 0257 | 20 | 0298 | 27 | 02D9 | 18 |
| 0217 | 78 | 0258 | 3F | 0299 | 3F | 02DA | CD |
| 0218 | D3 | 0259 | 1F | 029A | 21 | 02DB | 9C |
| 0219 | 02 | 025A | D2 | 029B | 2B | 02DC | 01 |
| 021A | 79 | 025B | 6A | 029C | 3F | 02DD | 3A |
| 021B | FB | 025C | 02 | 029D | 7E | 02DE | 20 |
| 021C | 32 | 025D | 3A | 029E | B3 | 02DF | 3F |
| 021D | 44 | 025E | 4E | 029F | 77 | 02E0 | 1F |
| 021E | 3F | 025F | 3F | 02A0 | 23 | 02E1 | D2 |
| 021F | E6 | 0260 | A1 | 02A1 | 7E | 02E2 | EE |
| 0220 | 10 | 0261 | CA | 02A2 | B2 | 02E3 | 02 |
| 0221 | CA | 0262 | 6A | 02A3 | 77 | 02E4 | 3A |
| 0222 | 47 | 0263 | 02 | 02A4 | 0E | 02E5 | 4E |
| 0223 | 02 | 0264 | 11 | 02A5 | 04 | 02E6 | 3F |
| 0224 | F3 | 0265 | 23 | 02A6 | 78 | 02E7 | A1 |
| 0225 | 3A | 0266 | 3F | 02A7 | A1 | 02E8 | CA |
| 0226 | 4D | 0267 | C3 | 02A8 | CA | 02E9 | EE |
| 0227 | 3F | 0268 | 6D | 02A9 | D1 | 02EA | 02 |
| 0228 | F6 | 0269 | 02 | 02AA | 02 | 02EB | 11 |
| 0229 | 80 | 026A | 11 | 02AB | 0E | 02EC | 35 |

| | | | | | | |
|---|---|---|---|---|---|---|
| 022A | D3 | 026B | 21 | 02AC | 10 | 02ED | 3F |
| 022B | 02 | 026C | 3F | 02AD | CD | 02EE | 11 |
| 022C | 47 | 026D | 21 | 02AE | 9C | 02EF | 33 |
| 022D | 3C | 026E | 25 | 02AF | 01 | 02F0 | 3F |
| 022E | D3 | 026F | 3F | 02B0 | 3A | 02F1 | 21 |
| 022F | 02 | 0270 | 7E | 02B1 | 20 | 02F2 | 37 |
| 0230 | DB | 0271 | B3 | 02B2 | 3F | 02F3 | 3F |
| 0231 | 01 | 0272 | 77 | 02B3 | 1F | 02F4 | 7E |
| 0232 | 32 | 0273 | 23 | 02B4 | D2 | 02F5 | B3 |
| 0233 | 4E | 0274 | 7E | 02B5 | C4 | 02F6 | 77 |
| 0234 | 3F | 0275 | B2 | 02B6 | 02 | 02F7 | 23 |
| 0235 | 78 | 0276 | 77 | 02B7 | 3A | 02F8 | 7E |
| 0236 | D3 | 0277 | 0E | 02B8 | 4E | 02F9 | B2 |
| 0237 | 02 | 0278 | 02 | 02B9 | 3F | 02FA | 77 |
| 0238 | FB | 0279 | 78 | 02BA | A1 | 02FB | C3 |
| 0239 | 06 | 027A | A1 | 02BB | CA | 02FC | 05 |
| 023A | 30 | 027B | CA | 02BC | C4 | 02FD | 02 |
| 023B | CD | 027C | A4 | 02BD | 02 | 02FE | 11 |
| 023C | 9C | 027D | 02 | 02BE | 11 | 02FF | 00 |
| 023D | 01 | 027E | 06 | 02BF | 2F | 0300 | 00 |
| 023E | CD | 027F | 08 | 02C0 | 3F | 0301 | 2A |
| 023F | FE | 0280 | CD | 02C1 | C3 | 0302 | 45 |
| 0240 | 02 | 0281 | 9C | 02C2 | C7 | 0303 | 3F |
| 0241 | CD | 0282 | 01 | 02C3 | 02 | 0304 | EB |
| 0242 | A9 | 0283 | 3A | 02C4 | 11 | 0305 | 22 |
| 0243 | 01 | 0284 | 20 | 02C5 | 2D | 0306 | 45 |
| 0244 | CD | 0285 | 3F | 02C6 | 3F | 0307 | 3F |
| 0245 | BE | 0286 | 1F | 02C7 | 21 | 0308 | 2A |
| 0246 | 01 | 0287 | D2 | 02C8 | 31 | 0309 | 47 |
| 0247 | 3A | 0288 | 97 | 02C9 | 3F | 030A | 3F |
| 0248 | 44 | 0289 | 02 | 02CA | 7E | 030B | 22 |
| 030C | 49 | 034C | 2A | 038C | 03 | 03CC | 0A |
| 030D | 3F | 034D | 45 | 038D | 0A | 03CD | E6 |
| 030E | EB | 034E | 3F | 038E | E6 | 03CE | F9 |
| 030F | 22 | 034F | 23 | 038F | FD | 03CF | 02 |
| 0310 | 47 | 0350 | 22 | 0390 | 02 | 03D0 | D3 |
| 0311 | 3F | 0351 | 45 | 0391 | D3 | 03D1 | 02 |
| 0312 | 7D | 0352 | 3F | 0392 | 02 | 03D2 | 1A |
| 0313 | 93 | 0353 | 11 | 0393 | 1A | 03D3 | E6 |
| 0314 | 5F | 0354 | 3A | 0394 | E6 | 03D4 | EF |
| 0315 | 7C | 0355 | 3F | 0395 | BF | 03D5 | 12 |
| 0316 | 9A | 0356 | 1A | 0396 | 12 | 03D6 | E1 |
| 0317 | 57 | 0357 | B7 | 0397 | 13 | 03D7 | D1 |
| 0318 | D2 | 0358 | F2 | 0398 | 1A | 03D8 | C1 |
| 0319 | 23 | 0359 | 7C | 0399 | B7 | 03D9 | F1 |
| 031A | 03 | 035A | 03 | 039A | F2 | 03DA | C9 |
| 031B | 3F | 035B | 2A | 039B | EB | 03DB | 3E |
| 031C | 7B | 035C | 3F | 039C | 03 | 03DC | 01 |
| 031D | 2F | 035D | 3F | 039D | 2A | 03DD | 32 |
| 031E | 5F | 035E | 2B | 039E | 41 | 03DE | 3D |
| 031F | 7A | 035F | 22 | 039F | 3F | 03DF | 3F |
| 0320 | 2F | 0360 | 3F | 03A0 | 2B | 03E0 | 3E |
| 0321 | 57 | 0361 | 3F | 03A1 | 22 | 03E1 | 21 |
| 0322 | 13 | 0362 | 7D | 03A2 | 41 | 03E2 | 32 |
| 0323 | 7D | 0363 | B4 | 03A3 | 3F | 03E3 | 4E |
| 0324 | E6 | 0364 | C2 | 03A4 | 7D | 03E4 | 3F |
| 0325 | E0 | 0365 | 7C | 03A5 | B4 | 03E5 | C9 |
| 0326 | 6F | 0366 | 03 | 03A6 | C2 | 03E6 | 00 |
| 0327 | 06 | 0367 | 1A | 03A7 | EB | 03E7 | 00 |
| 0328 | 05 | 0368 | E6 | 03A8 | 03 | 03E8 | 00 |
| | | | | | | 03E9 | 00 |

| | | | | | | |
|---|---|---|---|---|---|---|
| 0329 | 7C | 0369 | 7F | 03A9 | 1A | 03EA 00 |
| 032A | 1F | 036A | F6 | 03AA | E6 | 03EB 00 |
| 032B | 67 | 036B | 40 | 03AB | 7F | 03EC 00 |
| 032C | 7D | 036C | 12 | 03AC | F6 | 03ED 00 |
| 032D | 1F | 036D | 01 | 03AD | 40 | 03EE 00 |
| 032E | 6F | 036E | 4D | 03AE | 12 | 03EF 00 |
| 032F | 05 | 036F | 3F | 03AF | 0A | 03F0 00 |
| 0330 | C2 | 0370 | 0A | 03B0 | F6 | 03F1 00 |
| 0331 | 29 | 0371 | F6 | 03B1 | 04 | 03F2 00 |
| 0332 | 03 | 0372 | 02 | 03B2 | 02 | 03F3 00 |
| 0333 | 7D | 0373 | 02 | 03B3 | D3 | 03F4 00 |
| 0334 | 93 | 0374 | D3 | 03B4 | 02 | 03F5 00 |
| 0335 | 7C | 0375 | 02 | 03B5 | 2A | 03F6 00 |
| 0336 | 9A | 0376 | 2A | 03B6 | 4B | 03F7 00 |
| 0337 | D2 | 0377 | 4B | 03B7 | 3F | 03F8 00 |
| 0338 | 44 | 0378 | 3F | 03B8 | 22 | 03F9 00 |
| 0339 | 03 | 0379 | 22 | 03B9 | 28 | 03FA 00 |
| 033A | AF | 037A | 20 | 03BA | 00 | 03FB 00 |
| 033B | D3 | 037B | 00 | 03BB | 1A | 03FC 00 |
| 033C | 02 | 037C | 1A | 03BC | 07 | 03FD 00 |
| 033D | 06 | 037D | 07 | 03BD | F2 | RESET |
| 033E | 04 | 037E | F2 | 03BE | DA | PX |
| 033F | D3 | 037F | 97 | 03BF | 03 | |
| 0340 | 03 | 0380 | 03 | 03C0 | 2A | |
| 0341 | C3 | 0381 | 2A | 03C1 | 28 | |
| 0342 | 3A | 0382 | 20 | 03C2 | 00 | |
| 0343 | 03 | 0383 | 00 | 03C3 | 2B | |
| 0344 | CD | 0384 | 2B | 03C4 | 22 | |
| 0345 | DB | 0385 | 22 | 03C5 | 28 | |
| 0346 | 03 | 0386 | 20 | 03C6 | 00 | |
| 0347 | C9 | 0387 | 00 | 03C7 | 7D | |
| 0348 | F5 | 0388 | 7D | 03C8 | B4 | |
| 0349 | C5 | 0389 | B4 | 03C9 | C2 | |
| 034A | D5 | 038A | C2 | 03CA | DA | |
| 034B | E5 | 038B | 97 | 03CB | 03 | |

We claim:

1. A selective transfer system comprising
a continuous chain means for disposition adjacent a stream of articles moving in a particular direction, whereby a portion of said chain means is movable in a direction substantially parallel to said stream of articles, said chain means including a plurality of transfer means selectively projectable in a direction substantially transverse to said chain means so as to extend into said stream of articles to engage any particular article and displace it from the stream of articles second means for driving said continuous chain means at substantially the same linear speed as the stream of articles, and third means responsive to the location of a transfer means at the time an article decision signal is generated to control the transfer means, when the specific article reaches the transfer means, to extend one or two transfer means to engage the particular article and displace it from the stream of articles, said third means being a means for extending one transfer means if said transfer means will engage the approximate center of the particular article to be displaced, and for extending two transfer means to engage the particular article on opposite sides of the center thereof if one transfer means is not extendable to engage the approximate center of the particular article.

2. The system of claim 1 wherein said third means is a means responsive to at least one electrical control signal indicative of a particular article to be displaced from the stream of articles.

3. The system of claim 2 wherein said third means includes a delay means for each said electrical control signal to delay the extension of said transfer means by a predetermined amount of travel of said chain means to allow for the receipt of said control signal some time prior to the extension of said transfer means to displace the particular article associated with said control signal from the stream of articles.

4. The system of claim 3 wherein said delay means is a manually variable means.

5. The system of claim 3 wherein said at least one electrical control signal comprises a plurality of control signals.

6. The system of claim 5 wherein said delay means for each said electrical control signal is a manually variable means.

7. The system of claim 3 further comprised of means responsive to the speed of said continuous chain means for reducing the delay of said delay means with increasing chain speed.

8. A selective transfer system comprising
a continuous chain means for disposition adjacent a stream of articles moving in a particular direction, whereby a portion of said chain means is movable in a direction substantially parallel to said stream of articles, said chain means including a plurality of transfer means, each selectively and partially extendable in a direction substantially transverse to said chain means so as to engage guide means to first further extend into said stream of articles to engage any particular article and displace it from the stream of articles and then to retract the selected transfer means
second means for driving said continuous chain means at substantially the same linear speed as the stream of articles
actuator means responsive to actuator control signals to engage and partially extend said transfer means aligned therewith upon actuation of said actuator means, and
control means responsive to the location of a transfer means at the time an article decision signal is generated to control the transfer means, when the specific article reaches the transfer means, to provide at least one actuator control signal to initially extend either one or two transfer means, said control means being a means for providing actuator control signals to extend one transfer means if said transfer means will engage the approximate center of the particular article to be displaced, and for extending two transfer means to engage the particular article on opposite sides of the center thereof if one transfer means is not extendable to engage the approximate center of the particular article.

9. The system of claim 8 wherein said control means is a means responsive to at least one electrical reject control signal indicative of a particular article to be displaced from the stream of articles.

10. The system of claim 9 wherein said control means includes a delay means for each said electrical reject signal, such delay means being a means to delay the partial extension of said transfer means by a predetermined amount of travel of said chain means to allow for the receipt of said reject signal some time prior to the associated partial extension of said transfer means, whereby a series of successive inspections may be performed and one or more reject signals received prior to the arrival of an article to be rejected adjacent to the selective transfer system.

11. The system of claim 10 wherein said delay means is a manually variable means.

12. The system of claim 10 wherein said at least one electrical reject signal comprises a plurality of reject signals.

13. The system of claim 12 wherein said delay means for each said electrical reject signal is a manually variable means.

14. The system of claim 10 further comprised of means responsive to the speed of said continuous chain means for reducing the delay of said delay means with increasing chain speed.

15. The system of claim 8 wherein said actuator means includes means for yielding upon the engagement with the next successive transfer means when in at least a partially actuated condition.

16. The transfer system of claim 8 wherein said actuator means comprises at least two actuators, either of which may be used to partially extend a transfer means, said control means further being a means for providing actuator control signals to control which actuator will be used to partially extend any particular transfer means.

17. The transfer system of claim 16 wherein the number of actuators is two and said control means is a means to provide actuator control signals to approximately alternately operate said actuators.

18. The transfer system of claim 8 further comprised of means for stopping said second means in the event any of said transfer means become mispositioned so as to be on a collision course with said guide means.

19. A selective transfer system comprising
a continuous chain means for disposition adjacent a stream of articles moving in a particular direction, whereby a portion of said chain means is movable in a direction substantially parallel to said stream of articles, said chain means including a plurality of transfer means, each selectively and partially extendable in a direction substantially transverse to said chain means so as to engage guide means to first further extend into said stream of articles to engage any particular article and displace it from the stream of articles and then to retract the selected transfer means
second means for driving said continuous chain means at substantially the same linear speed as the stream of articles
at least two actuators responsive to actuator control signals to engage and partially extend transfer means aligned therewith upon actuation of said actuator means, and
control means responsive to the location of a transfer means at the time an article decision signal is generated to control the transfer means, when the specific article reaches the transfer means, to provide at least one actuator control signal to initially extend either one or two transfer means depending on whether one transfer means will extend to engage the approximate center of the particular article to be transferred, said control means being a means responsive to at least one reject control signal indicative of a particular article to be displaced from the stream of articles and includes delay means for each said electrical reject signal to delay the partial extension of said transfer means by a predetermined amount of travel of said chain means to allow for the receipt of said reject signal some time prior to the associated partial extension of said transfer means,
said control means further being a means responsive to the speed of said continuous chain means for reducing the delay of said delay means with increasing speed of said chain means.

20. The system of claim 19 herein each said actuator includes means for yielding upon the engagement with the next successive transfer means when in at least a partially actuated condition.

21. The transfer system of claim 20 wherein said control means further comprises a means for providing actuator control signals to control which actuator will be used to partially extend any particular transfer means.

22. A selective transfer system comprising a continuous chain means for disposition adjacent a stream of articles moving in a particular direction, whereby a portion of said chain means is movable in a direction substantially parallel to said stream of articles, said chain means including a plurality of transfer means selectively projectable in a direction substantially transverse to said chain means so as to extend into said stream of articles to engage any particular article and displace it from the stream of articles second means for driving said continuous chain means at substantially the same linear speed as the stream of articles, and third means responsive to the location of a transfer means at the time an article decision signal is generated to control the transfer means, when the specific article reaches the transfer means, to extend a predetermined and manually variable plurality of said transfer means dependent on the size of the article being transferred to engage the particular article and displace it from the stream of articles.

23. A selective transfer system comprising a continuous chain means for disposition adjacent a stream of articles moving in a particular direction, whereby a portion of said chain means is movable in a direction substantially parallel to said stream of articles, said chain means including a plurality of transfer means, each selectively and partially extendable in a direction substantially transverse to said chain means so as to engage guide means to first further extend into said stream of articles to engage any particular article and displace it from the stream of articles and then to retract the selected transfer means second means for driving said continuous chain means at substantially the same linear speed as the stream of articles actuator means responsive to actuator control signals to engage and partially extend transfer means aligned therewith upon actuation of said actuator means control means responsive to the location of a transfer means at the time an article decision signal is generated to control the transfer means, when the specific article reaches the transfer means, to provide actuator control signals to initially extend a plurality of transfer means, and means for manually predetermining the number of transfer means to be extended to engage any particular article to displace it from the stream of articles.

24. The system of claim 23 wherein said control means is a means responsive to at least one electrical reject control signal indicative of a particular article to be displaced from the stream of articles.

25. The system of claim 24 wherein said control means includes a delay means for each said electrical reject signal, said delay means being a means to delay the partial extension of said transfer means by a predetermined amount of travel of said chain means to allow for the receipt of said reject signal some time prior to the associated partial extension of said transfer means, whereby a series of successive inspections may be performed and one or more reject signals received prior to the arrival of an article to be rejected adjacent to the selective transfer system.

26. The system of claim 25 wherein said delay means is a manually variable means.

27. The system of claim 25 wherein said at least one electrical reject signal comprises a plurality of reject signals.

28. The system of claim 27 wherein said delay means for each said electrical reject signal is a manually variable means.

29. The system of claim 25 further comprised of means responsive to the speed of said continuous chain means for reducing the delay of said delay means with increasing chain speed.

30. The system of claim 23 wherein said actuator means includes means for yielding upon the engagement with the next successive transfer means when in at least a partially actuated condition.

31. The transfer system of claim 23 wherein said actuator means comprises at least two actuators, either of which may be used to partially extend a transfer means, said control means further being a means for providing actuator control signals to control which actuator will be used to partially extend any particular transfer means.

32. The transfer system of claim 31 wherein the number of actuators is two and said control means is a means to provide actuator control signals to approximately alternately operate said actuators.

33. A selective transfer system comprising a continuous chain means for disposition adjacent a stream of articles moving in a particular direction, whereby a portion of said chain means is movable in a direction substantially parallel to said stream of articles, said chain means including a plurality of transfer means, each selectively and partially extendable in a direction substantially transverse to said chain means so as to engage guide means to first further extend into said stream of articles to engage any particular article and displace it from the stream of articles and then to retract the selected transfer means second means for driving said continuous chain means at substantially the same linear speed as the stream of articles actuator means responsive to actuator control signals to engage and partially extend said transfer means aligned therewith upon actuation of said actuator means, and control means responsive to a plurality of electrical reject signals indicative of particular articles to be displaced from the stream of articles to provide actuator control signals to initially extend selected transfer means, said control means including a delay means for each said electrical reject signal, said delay means being a means to delay the partial extension of said transfer means by a predetermined amount of travel of said chain means to allow for the receipt of said reject signal some time prior to the associated partial extension of said transfer means, whereby a series of successive inspections may be performed and one or more reject signals received prior to the arrival of an article to be rejected adjacent to the selective transfer system, said delay means being a means responsive to the speed of said continuous chain means for reducing the delay of said delay means with increasing speed to compensate for time delays in partially extending said transfer means.

34. The system of claim 33 wherein said delay means is a manually variable means.

35. The transfer system of claim 33 wherein said actuator means comprises at least two actuators, either of which may be used to partially extend a transfer means, said control means further being a means for providing actuator control signals to control which actuator will be used to partially extend any particular transfer means.

36. The transfer system of claim 35 wherein the number of actuators is two and said control means is a means to provide actuator control signals to approximately alternately operate said actuators.

37. A selective transfer system comprising a continuous chain means for disposition adjacent a stream of articles moving in a particular direction, whereby a portion of said chain means is movable in a direction substantially parallel to said stream of articles, said chain means including a plurality of transfer means, each selectively and partially extendable in a direction substantially transverse to said chain means so as to engage guide means to first further extend into said stream of articles to engage any particular article and displace it from the stream of articles and then to retract the selected transfer means second means for driving said continuous chain means at substantially the same linear speed as the stream of articles actuator means responsive to actuator control signals to engage and partially extend transfer means aligned therewith upon actuation of said actuator means, said actuator means including means for yielding upon the engagement with the next successive transfer means when in at least a partially actuated condition, and control means responsive to the location of a transfer means at the time an article decision signal is generated to control the transfer means, when the specific article reaches position of a particular article in the stream of articles, in relation to the position of the transfer means, to provide at least one actuator control signal to initially extend either one or two transfer means.

38. A selective transfer system comprising a continuous chain means for disposition adjacent a stream of articles moving in a particular direction, whereby a portion of said chain means is movable in a direction substantially parallel to said stream of articles, said chain means including a plurality of transfer means, each selectively and partially extendable in a direction substantially transverse to said chain means so as to engage guide means to first further extend into said stream of articles to engage any particular article and displace it from the stream of articles and then to retract the selected transfer means second means for driving said continuous chain means at substantially the same linear speed as the stream of articles actuator means responsive to actuator control signals to engage and partially extend transfer means aligned therewith upon actuation of said actuator means, control means responsive to the location of a transfer means at the time an article decision signal is generated to control the transfer means, when the specific article reaches position of a particular article in the stream of articles, in relation to the position of the transfer means, to provide at least one actuator control signal to initially extend either one or two transfer means, and means for stopping said second means in the event any of said transfer means become mispositioned so as to be on a collision course with said guide means.

* * * * *